US006473467B1

(12) United States Patent
Wallace et al.

(10) Patent No.: US 6,473,467 B1
(45) Date of Patent: Oct. 29, 2002

(54) METHOD AND APPARATUS FOR MEASURING REPORTING CHANNEL STATE INFORMATION IN A HIGH EFFICIENCY, HIGH PERFORMANCE COMMUNICATIONS SYSTEM

(75) Inventors: Mark Wallace, Bedford, MA (US); Jay R. Walton, Westford, MA (US); Ahmad Jalali, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/539,224

(22) Filed: Mar. 30, 2000

Related U.S. Application Data

(63) Continuation-in-part of application No. 09/532,492, filed on Mar. 22, 2000.

(51) Int. Cl.[7] .............................. H04B 7/02; H04J 11/00
(52) U.S. Cl. ...................... 375/267; 375/144; 375/260; 375/299; 375/347; 370/208; 370/210
(58) Field of Search .................... 375/144, 148, 375/260, 267, 299, 347; 370/208, 210; 455/101

(56) References Cited

U.S. PATENT DOCUMENTS

| | | | | |
|---|---|---|---|---|
| 5,170,413 A | * | 12/1992 | Hess et al. .................. | 375/260 |
| 5,274,836 A | * | 12/1993 | Lux ............................. | 455/1 |
| 5,748,683 A | * | 5/1998 | Smith et al. ................ | 375/347 |
| 5,790,516 A | * | 8/1998 | Gudmundson et al. ..... | 370/210 |
| 5,914,933 A | * | 6/1999 | Cimini et al. ............... | 370/208 |
| 5,933,421 A | * | 8/1999 | Alamouti et al. ........... | 370/330 |
| 6,141,393 A | * | 10/2000 | Thomas et al. ............. | 375/347 |
| 6,144,711 A | * | 11/2000 | Raleigh et al. ............. | 375/347 |
| 6,151,296 A | * | 11/2000 | Vijayan et al. ............. | 370/208 |
| 6,151,328 A | * | 11/2000 | Kwon et al. ................ | 370/441 |

FOREIGN PATENT DOCUMENTS

| | | |
|---|---|---|
| EP | 0 683 576 A1 | * 11/1995 |
| WO | 00/04728 | 1/2000 |

OTHER PUBLICATIONS

K.L. Baum et al., "A Comparison of Differential and Coherent Reception for a Coded OFDM System in a Low C/I Environment," IEEE Global Telecommunications Conference. Phoenix, Arizona, Nov. 3–8, 1987, Global Telecommunications Conference New York, IEEE, Us, vol. 1, Nov. 3, 1997 (pp. 300–304).

* cited by examiner

*Primary Examiner*—Young T. Tse
(74) *Attorney, Agent, or Firm*—Philip R. Wadsworth; Kent D. Baker; Kyong Macek

(57) ABSTRACT

Channel state information (CSI) can be used by a communications system to precondition transmissions between transmitter units and receiver units. In one aspect of the invention, disjoint sub-channel sets are assigned to transmit antennas located at a transmitter unit. Pilot symbols are generated and transmitted on a subset of the disjoint sub-channels. Upon receipt of the transmitted pilot symbols, the receiver units determine the CSI for the disjoint sub-channels that carried pilot symbols. These CSI values are reported to the transmitter unit, which will use these CSI values to generate CSI estimates for the disjoint sub-channels that did not carry pilot symbols. The amount of information necessary to report CSI on the reverse link can be further minimized through compression techniques and resource allocation techniques.

29 Claims, 12 Drawing Sheets

METHOD AND APPARATUS FOR MEASURING REPORTING CHANNEL STATE INFORMATION IN A HIGH EFFICIENCY, HIGH PERFORMANCE COMMUNICATIONS SYSTEM

CROSS REFERENCE TO RELATED APPLICATIONS

This is a continuation-in-part of co-pending application Ser. No. 09/532,492, entitled "HIGH EFFICIENCY, HIGH PERFORMANCE COMMUNICATIONS SYSTEM EMPLOYING MULTI-CARRIER MODULATION," filed on Mar. 22, 2000, assigned to the assignee of the present invention, and incorporated herein by reference.

BACKGROUND OF THE INVENTION

I. Field of the Invention

The present invention relates to the field of communications. More particularly, the present invention relates to the measurement and report of channel state information in a high efficiency, high performance communications system.

II. Description of the Related Art

A modern day wireless communications system is required to operate over channels that experience fading and multipath. One such communications system is a code division multiple access (CDMA) system that conforms to the "TIA/EIA/IS-95 Mobile Station-Base Station Compatibility Standard for Dual-Mode Wideband Spread Spectrum Cellular System," hereinafter referred to as the IS-95 standard. The CDMA system supports voice and data communication between users over a terrestrial link. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," and U.S. Pat. No. 5,103,459, entitled "SYSTEM AND METHOD FOR GENERATING WAVEFORMS IN A CDMA CELLULAR TELEPHONE SYSTEM," both assigned to the assignee of the present invention and incorporated herein by reference.

An IS-95 system can operate efficiently by estimating channel parameters at a receiver unit, which uses these estimated channel parameters to demodulate a received signal. The IS-95 system makes channel estimation efficient by requiring the transmission of a pilot signal from every base station. This pilot signal is a repeating PN-type sequence known by the receiver unit. Correlation of the received pilot signal with a local replica of the pilot signal enables the receiver unit to estimate the complex impulse response of the channel and adjust demodulator parameters accordingly. For the IS-95 waveform and system parameters it is not necessary or beneficial to report information on the channel conditions measured by the receiver unit back to the transmitter unit.

Given the ever-growing demand for wireless communication, a higher efficiency, higher performance wireless communications system is desirable. One type of higher performance wireless communications system is a Multiple Input/Multiple Output (MIMO) system that employs multiple transmit antennas to transmit over a propagation channel to multiple receive antennas. As in lower performance systems, the propagation channel in a MIMO system is subject to the deleterious effects of multipath, as well as interference from adjacent antennas. Multipath occurs when a transmitted signal arrives at a receiver unit through multiple propagation paths with differing delays. When signals arrive from multiple propagation paths, components of the signals can combine destructively, which is referred to as "fading." In order to improve the efficiency and decrease the complexity of the MIMO system, information as to the characteristics of the propagation channel can be transmitted back to the transmitter unit in order to precondition the signal before transmission.

Preconditioning the signal can be difficult when the characteristics of the propagation channel change rapidly. The channel response can change with time due to the movement of the receiver unit or changes in the environment surrounding the receiver unit. Given a mobile environment, an optimal performance requires that information regarding channel characteristics, such as fading and interference statistics, be determined and transmitted quickly to the transmitter unit before the channel characteristics change significantly. As delay of the measurement and reporting process increases, the utility of the channel response information decreases. A present need exists for efficient techniques that will provide rapid determination of the channel characteristics.

SUMMARY OF THE INVENTION

The present invention is directed to a method and apparatus for the measuring and reporting of channel state information in a high efficiency, high performance communications system, comprising the steps of: generating a plurality of pilot signals; transmitting the plurality of pilot signals over a propagation channel between a transmitter unit and a plurality of receiver units, wherein the transmitter unit comprises at least one transmit antenna, each of the plurality of receiver units comprises at least one receive antenna, and the propagation channel comprises a plurality of sub-channels between the transmitter unit and the plurality of receiver units; receiving at least one of the plurality of pilot signals at each of the plurality of receiver units; determining a set of transmission characteristics for at least one of the plurality of sub-channels, wherein the step of determining the set of transmission characteristics uses at least one of the plurality of pilot signals received at each of the plurality of receiver units; reporting an information signal from each of the plurality of receiver units to the transmitter unit, wherein the information signal carries the set of transmission characteristics for at least one of the plurality of sub-channels; and optimizing a set of transmission parameters at the transmitter unit, based on the information signal.

In one aspect of the invention, pilot symbols are transmitted on a plurality of disjoint OFDM sub-channel sets. When the pilot symbols are transmitted on disjoint OFDM sub-channels, the characteristics of the propagation channel can be determined through a set of K sub-channels carrying the pilot symbols, wherein K is less than the number of OFDM sub-channels in the system. In addition to transmitting pilot symbols on disjoint sub-channels, the system can transmit a time-domain pilot sequence that can be used to determine characteristics of the propagation channel. Along with the generation and transmission of pilot symbols, an aspect of the invention is the compression of the amount of information necessary to reconstruct the characteristics of the propagation channel.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1A:
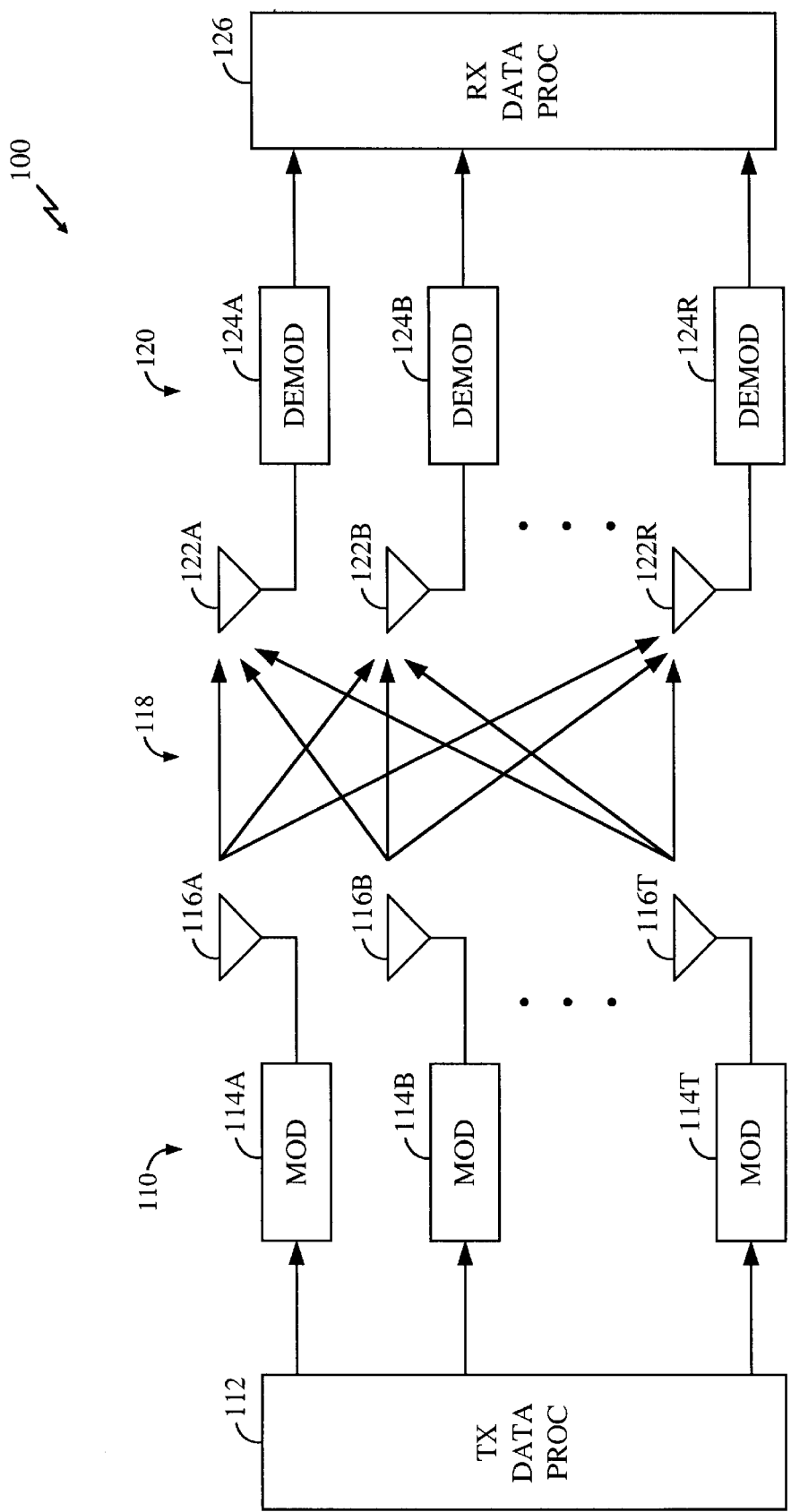
FIG. 1A is a diagram of a multiple-input multiple-output (MIMO) communications system.

FIG. 1A is a diagram of a Multiple Input/Multiple Output (MIMO) communications system 100 capable of implementing some embodiments of the invention. Communications system 100 can be operative to provide a combination of antenna, frequency, and temporal diversity to increase spectral efficiency, improve performance, and enhance flexibility. Increased spectral efficiency is characterized by the ability to transmit more bits per second per Hertz (bps/Hz) when and where possible to better utilize the available system bandwidth. Techniques to obtain higher spectral efficiency are described in further detail below. Improved performance may be quantified, for example, by a lower bit-error-rate (BER) or frame-error-rate (FER) for a given link carrier-to-noise-plus-interference ratio (C/I). And enhanced flexibility is characterized by the ability to accommodate multiple users having different and typically disparate requirements. These goals may be achieved, in part, by employing multi-carrier modulation, time division multiplexing (TDM), multiple transmit and/or receive antennas, and other techniques. The features, aspects, and advantages of the invention are described in further detail below.

As shown in FIG. 1A, communications system 100 includes a first system 110 in communication with a second system 120. System 110 includes a (transmit) data processor 112 that (1) receives or generates data, (2) processes the data to provide antenna, frequency, or temporal diversity, or a combination thereof, and (3) provides processed modulation symbols to a number of modulators (MOD) 114a through 114t. Each modulator 114 further processes the modulation symbols and generates an RF modulated signal suitable for transmission. The RF modulated signals from modulators 114a through 114t are then transmitted from respective antennas 116a through 116t over communications links 118 to system 120.

In FIG. 1A, system 120 includes a number of receive antennas 122a through 122r that receive the transmitted signals and provide the received signals to respective demodulators (DEMOD) 124a through 124r. As shown in FIG. 1A, each receive antenna 122 may receive signals from one or more transmit antennas 116 depending on a number of factors such as, for example, the operating mode used at system 110, the directivity of the transmit and receive antennas, the characteristics of the communications links, and others. Each demodulator 124 demodulates the respective received signal using a demodulation scheme that is complementary to the modulation scheme used at the transmitter. The demodulated symbols from demodulators 124a through 124r are then provided to a (receive) data processor 126 that further processes the symbols to provide the output data. The data processing at the transmitter and receiver units is described in further detail below.

FIG. 1A shows only the forward link transmission from system 110 to system 120. This configuration may be used for data broadcast and other one-way data transmission applications. In a bidirectional communications system, a reverse link from system 120 to system 110 is also provided, although not shown in FIG. 1A for simplicity. For the bidirectional communications system, each of systems 110 and 120 may operate as a transmitter unit or a receiver unit, or both concurrently, depending on whether data is being transmitted from, or received at, the unit.

For simplicity, communications system 100 is shown to include one transmitter unit (i.e., system 110) and one receiver unit (i.e., system 120). However, in general, multiple transmit antennas and multiple receive antennas are present on each transmitter unit and each receiver unit. The communications system of the invention may include any number of transmitter units and receiver units.

Each transmitter unit may include a single transmit antenna or a number of transmit antennas, such as that shown in FIG. 1A. Similarly, each receiver unit may include a single receive antenna or a number of receive antennas, again such as that shown in FIG. 1A. For example, the communications system may include a central system (i.e., similar to a base station in the IS-95 CDMA system) having a number of antennas that transmit data to, and receive data from, a number of remote systems (i.e., subscriber units, similar to remote stations in the CDMA system), some of which may include one antenna and others of which may include multiple antennas.

As used herein, an antenna refers to a collection of one or more antenna elements that are distributed in space. The antenna elements may be physically located at a single site or distributed over multiple sites. Antenna elements physically co-located at a single site may be operated as an antenna array (e.g., such as for a CDMA base station). An antenna network consists of a collection of antenna arrays or elements that are physically separated (e.g., several CDMA base stations). An antenna array or an antenna network may be designed with the ability to form beams and to transmit multiple beams from the antenna array or network. For example, a CDMA base station may be designed with the capability to transmit up to three beams to three different sections of a coverage area (or sectors) from the same antenna array. Thus, the three beams may be viewed as three transmissions from three antennas.

The communications system of the invention can be designed to provide a multi-user, multiple access communications scheme capable of supporting subscriber units having different requirements as well as capabilities. The scheme allows the system's total operating bandwidth, W, (e.g., 1.2288 MHz) to be efficiently shared among different types of services that may have highly disparate data rate, delay, and quality of service (QOS) requirements.

Examples of such disparate types of services include voice services and data services. Voice services are typically characterized by a low data rate (e.g., 8 kbps to 32 kbps), short processing delay (e.g., 3 msec to 100 msec overall one-way delay), and sustained use of a communications channel for an extended period of time. The short delay requirements imposed by voice services typically require a small fraction of the system resources to be dedicated to each voice call for the duration of the call. In contrast, data services are characterized by "bursty" traffics in which variable amounts of data are sent at sporadic times. The amount of data can vary significantly from burst-to-burst and from user-to-user. For high efficiency, the communications system of the invention can be designed with the capability to allocate a portion of the available resources to voice services as required and the remaining resources to data services. A fraction of the available system resources may also be dedicated for certain data services or certain types of data services.

The distribution of data rates achievable by each subscriber unit can vary widely between some minimum and maximum instantaneous values (e.g., from 200 kbps to over 20 Mbps). The achievable data rate for a particular subscriber unit at any given moment may be influenced by a number of factors such as the amount of available transmit power, the quality of the communications link (i.e., the C/I), the coding scheme, and others. The data rate requirement of each subscriber unit may also vary widely between a minimum value (e.g., 8 kbps, for a voice call) all the way up to the maximum supported instantaneous peak rate (e.g., 20 Mbps for bursty data services).

The percentage of voice and data traffic is typically a random variable that changes over time. In accordance with certain aspects of the invention, to efficiently support both types of services concurrently, the communications system of the invention is designed with the capability to dynamic allocate the available resources based on the amount of voice and data traffic. A scheme to dynamically allocate resources is described below. Another scheme to allocate resources is described in the aforementioned U.S. patent application Ser. No. 08/963,386.

The communications system of the invention provides the above-described features and advantages, and is capable of supporting different types of services having disparate requirements. The features are achieved by employing antenna, frequency, or temporal diversity, or a combination thereof. Antenna, frequency, or temporal diversity can be independently achieved and dynamically selected.

As used herein, antenna diversity refers to the transmission and/or reception of data over more than one antenna, frequency diversity refers to the transmission of data over more than one sub-band, and temporal diversity refers to the transmission of data over more than one time period. Antenna, frequency, and temporal diversity may include subcategories. For example, transmit diversity refers to the use of more than one transmit antenna in a manner to improve the reliability of the communications link, receive diversity refers to the use of more than one receive antenna in a manner to improve the reliability of the communications link, and spatial diversity refers to the use of multiple transmit and receive antennas to improve the reliability and/or increase the capacity of the communications link.

Transmit and receive diversity can also be used in combination to improve the reliability of the communications link without increasing the link capacity. Various combinations of antenna, frequency, and temporal diversity can thus be achieved and are within the scope of the present invention.

Frequency diversity can be provided by use of a multi-carrier modulation scheme such as orthogonal frequency division multiplexing (OFDM), which allows for transmission of data over various sub-bands of the operating bandwidth. Temporal diversity is achieved by transmitting the data over different times, which can be more easily accomplished with the use of time-division multiplexing (TDM). These various aspects of the communications system of the invention are described in further detail below.

In accordance with an aspect of the invention, antenna diversity is achieved by employing a number of ($N_T$) transmit antennas at the transmitter unit or a number of ($N_R$) receive antennas at the receiver unit, or multiple antennas at both the transmitter and receiver units. In a terrestrial communications system (e.g., a cellular system, a broadcast system, an MMDS system, and others), an RF modulated signal from a transmitter unit may reach the receiver unit via a number of transmission paths. The characteristics of the transmission paths typically vary over time based on a number of factors. If more than one transmit or receive antenna is used, and if the transmission paths between the transmit and receive antennas are independent (i.e., uncorrelated), which is generally true to at least an extent, then the likelihood of correctly receiving the transmitted signal increases as the number of antennas increases. Generally, as the number of transmit and receive antennas increases, diversity increases and performance improves.

Antenna diversity is dynamically provided based on the characteristics of the communications link to provide the required performance. For example, a higher degree of antenna diversity can be provided for some types of communication (e.g., signaling), for some types of services (e.g., voice), for some communications link characteristics (e.g., low C/I), or for some other conditions or considerations.

As used herein, antenna diversity includes transmit diversity and receive diversity. For transmit diversity, data is transmitted over multiple transmit antennas. Typically, additional processing is performed on the data transmitted from the transmit antennas to achieve the desired diversity. For example, the data transmitted from different transmit antennas may be delayed or reordered in time, or coded and interleaved across the available transmit antennas. Also, frequency and temporal diversity may be used in conjunction with the different transmit antennas. For receive diversity, modulated signals are received on multiple receive antennas, and diversity is achieved by simply receiving the signals via different transmission paths.

In accordance with another aspect of the invention, frequency diversity can be achieved by employing a multi-carrier modulation scheme. One such scheme that has numerous advantages is OFDM. With OFDM modulation, the overall transmission channel is essentially divided into a number of (L) parallel sub-channels that are used to transmit the same or different data. The overall transmission channel occupies the total operating bandwidth of W, and each of the sub-channels occupies a sub-band having a bandwidth of W/L and centered at a different center frequency. Each sub-channel has a bandwidth that is a portion of the total operating bandwidth. Each of the sub-channels may also be considered an independent data transmission channel that may be associated with a particular (and possibly unique) processing, coding, and modulation scheme, as described below.

The data may be partitioned and transmitted over any defined set of two or more sub-bands to provide frequency diversity. For example, the transmission to a particular subscriber unit may occur over sub-channel 1 at time slot 1, sub-channel 5 at time slot 2, sub-channel 2 at time slot 3, and so on. As another example, data for a particular subscriber unit may be transmitted over sub-channels 1 and 2 at time slot 1 (e.g., with the same data being transmitted on both sub-channels), sub-channels 4 and 6 at time slot 2, only sub-channel 2 at time slot 3, and so on. Transmission of data over different sub-channels over time can improve the performance of a communications system experiencing frequency selective fading and channel distortion. Other benefits of OFDM modulation are described below.

In accordance with yet another aspect of the invention, temporal diversity is achieved by transmitting data at different times, which can be more easily accomplished using time division multiplexing (TDM). For data services (and possibly for voice services), data transmission occurs over time slots that may be selected to provide immunity to time dependent degradation in the communications link. Temporal diversity may also be achieved through the use of interleaving.

For example, the transmission to a particular subscriber unit may occur over time slots 1 through x, or on a subset of the possible time slots from 1 through x (e.g., time slots 1, 5, 8, and so on). The amount of data transmitted at each time slot may be variable or fixed. Transmission over multiple time slots improves the likelihood of correct data reception due to, for example, impulse noise and interference.

The combination of antenna, frequency, and temporal diversity allows the communications system of the invention to provide robust performance. Antenna, frequency, and/or temporal diversity improves the likelihood of correct reception of at least some of the transmitted data, which may then be used (e.g., through decoding) to correct for some errors that may have occurred in the other transmissions. The combination of antenna, frequency, and temporal diversity also allows the communications system to concurrently accommodate different types of services having disparate data rate, processing delay, and quality of service requirements.

The communications system of the invention can be designed and operated in a number of different communications modes, with each communications mode employing antenna, frequency, or temporal diversity, or a combination thereof. The communications modes include, for example, a diversity communications mode and a MIMO communications mode. Various combinations of the diversity and MIMO communications modes can also be supported by the communications system. Also, other communications modes can be implemented and are within the scope of the present invention.

The diversity communications mode employs transmit and/or receive diversity, frequency, or temporal diversity, or a combination thereof, and is generally used to improve the reliability of the communications link. In one implementation of the diversity communications mode, the transmitter unit selects a modulation and coding scheme (i.e., configuration) from a finite set of possible configurations, which are known to the receiver units. For example, each overhead and common channel may be associated with a particular configuration that is known to all receiver units. When using the diversity communications mode for a specific user (e.g., for a voice call or a data transmission), the mode and/or configuration may be known a priori (e.g., from a previous set up) or negotiated (e.g., via a common channel) by the receiver unit.

In the diversity communications mode, data is transmitted on one or more sub-channels, from one or more antennas, and at one or more time periods. The allocated sub-channels may be associated with the same antenna, or may be sub-channels associated with different antennas. In a common application of the diversity communications mode, which is also referred to as a "pure" diversity communications mode, data is transmitted from all available transmit antennas to the destination receiver unit. The pure diversity communications mode can be used in instances where the data rate requirements are low or when the C/I is low, or when both are true.

The MIMO communications mode employs antenna diversity at both ends of the communication link and is generally used to improve both the reliability and increase the capacity of the communications link. The MIMO communications mode may further employ frequency and/or temporal diversity in combination with the antenna diversity. The MIMO communications mode, which may also be referred to herein as the spatial communications mode, employs one or more processing modes to be described below.

The diversity communications mode generally has lower spectral efficiency than the MIMO communications mode, especially at high C/I levels. However, at low to moderate C/I values, the diversity communications mode achieves comparable efficiency and can be simpler to implement. In general, the use of the MIMO communications mode provides greater spectral efficiency when used, particularly at moderate to high C/I values. The MIMO communications mode may thus be advantageously used when the data rate requirements are moderate to high.

The communications system can be designed to concurrently support both diversity and MIMO communications modes. The communications modes can be applied in various manners and, for increased flexibility, may be applied independently on a sub-channel basis. The MIMO communications mode is typically applied to specific users. However, each communications mode may be applied on each sub-channel independently, across a subset of sub-channels, across all sub-channels, or on some other basis. For example, the use of the MIMO communications mode may be applied to a specific user (e.g., a data user) and, concurrently, the use of the diversity communications mode may be applied to another specific user (e.g., a voice user) on a different sub-channel. The diversity communications mode may also be applied, for example, on sub-channels experiencing higher path loss.

The communications system of the invention can also be designed to support a number of processing modes. When the transmitter unit is provided with information indicative of the conditions (i.e., the "state") of the communications links, additional processing can be performed at the transmitter unit to further improve performance and increase efficiency. Full channel state information (CSI) or partial CSI may be available to the transmitter unit. Full CSI includes sufficient characterization of the propagation path (i.e., amplitude and phase) between all pairs of transmit and receive antennas for each sub-band. Full CSI also includes the C/I per sub-band. The full CSI may be embodied in a set of matrices of complex gain values that are descriptive of the conditions of the transmission paths from the transmit antennas to the receive antennas, as described below. Partial CSI may include, for example, the C/I of the sub-band. With full CSI or partial CSI, the transmitter unit pre-conditions the data prior to transmission to receiver unit.

The transmitter unit can precondition the signals presented to the transmit antennas in a way that is unique to a specific receiver unit (e.g., the pre-conditioning is performed for each sub-band assigned to that receiver unit). As long as the channel does not change appreciably from the time it is measured by the receiver unit and subsequently sent back to the transmitter and used to precondition the transmission, the intended receiver unit can demodulate the transmission. In this implementation, a full-CSI based MIMO communication can only be demodulated by the receiver unit associated with the CSI used to precondition the transmitted signals.

In the partial-CSI or no-CSI processing modes, the transmitter unit can employ a common modulation and coding scheme (e.g., on each data channel transmission), which then can be (in theory) demodulated by all receiver units. In the partial-CSI processing mode, a single receiver unit can specify the C/I, and the modulation employed on all antennas can be selected accordingly (e.g., for reliable transmission) for that receiver unit. Other receiver units can attempt to demodulate the transmission and, if they have adequate C/I, may be able to successfully recover the transmission. A common (e.g., broadcast) channel can use a no-CSI processing mode to reach all users.

As an example, assume that the MIMO communications mode is applied to a channel data stream that is transmitted on one particular sub-channel from four transmit antennas. The channel data stream is demultiplexed into four data sub-streams, one data sub-stream for each transmit antenna. Each data sub-stream is then modulated using a particular modulation scheme (e.g., M-PSK, M-QAM, or other) selected based on the CSI for that sub-band and for that transmit antenna. Four modulation sub-streams are thus generated for the four data sub-streams, with each modulation sub-streams including a stream of modulation symbols. The four modulation sub-streams are then pre-conditioned using the eigenvector matrix, as expressed below in equation (1), to generate pre-conditioned modulation symbols. The four streams of pre-conditioned modulation symbols are respectively provided to the four combiners of the four transmit antennas. Each combiner combines the received pre-conditioned modulation symbols with the modulation symbols for the other sub-channels to generate a modulation symbol vector stream for the associated transmit antenna.

The full-CSI based processing is typically employed in the MIMO communications mode where parallel data streams are transmitted to a specific user on each of the channel eigenmodes for the each of the allocated sub-channels. Similar processing based on full CSI can be performed where transmission on only a subset of the available eigenmodes is accommodated in each of the allocated sub-channels(e.g., to implement beam steering). Because of the cost associated with the full-CSI processing (e.g., increased complexity at the transmitter and receiver units, increased overhead for the transmission of the CSI from the receiver unit to the transmitter unit, and so on), full-CSI processing can be applied in certain instances in the MIMO communications mode where the additional increase in performance and efficiency is justified.

In instances where full CSI is not available, less descriptive information on the transmission path (or partial CSI) may be available and can be used to pre-condition the data prior to transmission. For example, the C/I of each of the sub-channels may be available. The C/I information can then be used to control the transmission from various transmit antennas to provide the required performance in the sub-channels of interest and increase system capacity.

As used herein, full-CSI based processing modes denote processing modes that use full CSI, and partial-CSI based processing modes denote processing modes that use partial CSI. The full-CSI based processing modes include, for example, the full-CSI MIMO mode that utilizes full-CSI based processing in the MIMO communications mode. The partial-CSI based modes include, for example, the partial-CSI MIMO mode that utilizes partial-CSI based processing in the MIMO communications mode.

In instances where full-CSI or partial-CSI processing is employed to allow the transmitter unit to pre-condition the data using the available channel state information (e.g., the eigenmodes or C/I), feedback information from the receiver unit is required, which uses a portion of the reverse link capacity. Therefore, there is a cost associated with the full-CSI and the partial-CSI based processing modes. The cost should be factored into the choice of which processing mode to employ. The partial-CSI based processing mode requires less overhead and may be more efficient in some instances. The no-CSI based processing mode requires no overhead and may also be more efficient than the full-CSI based processing mode or the partial-CSI based processing mode under some other circumstances.

Figure 2:
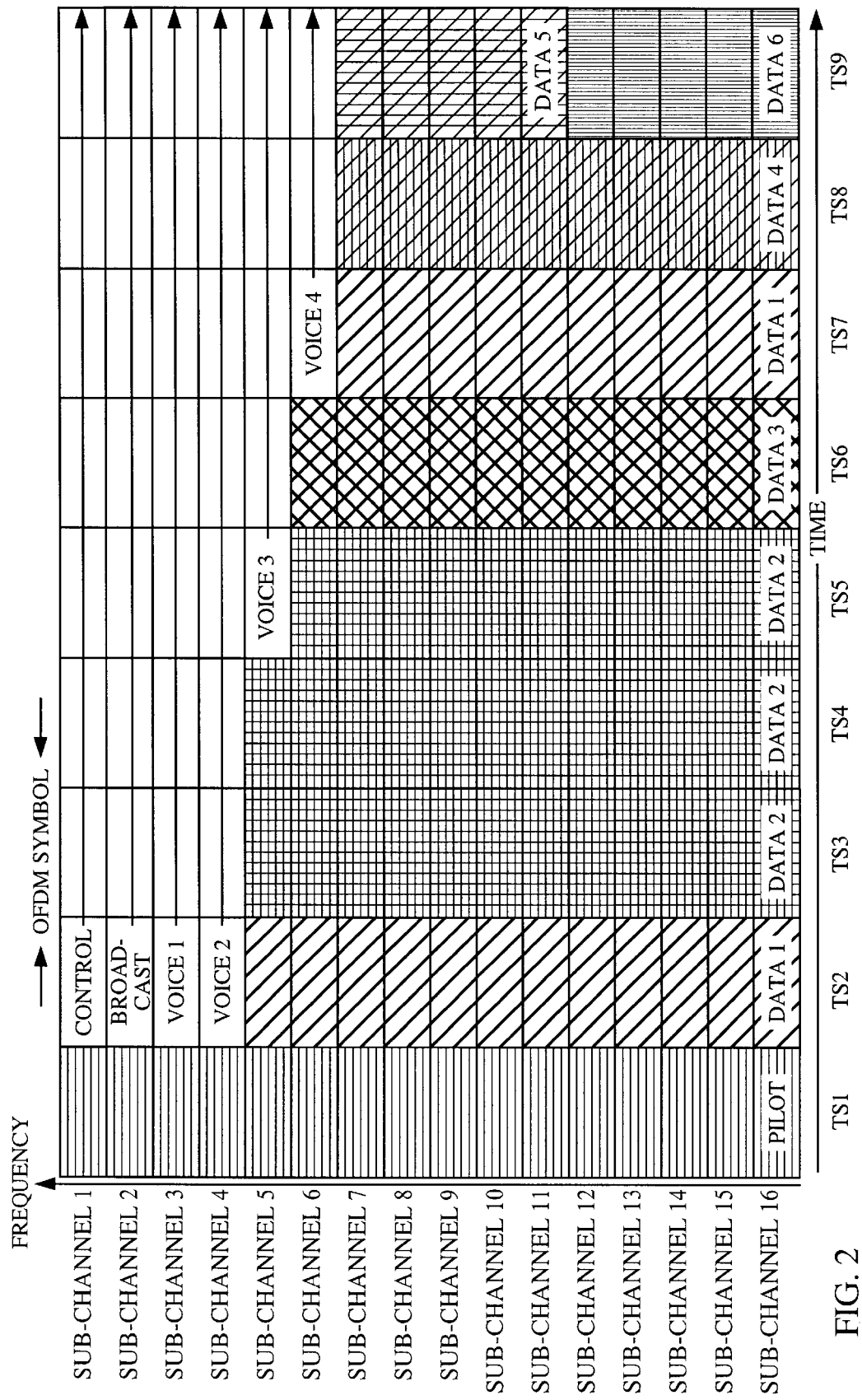
FIG. 2 is a diagram that graphically illustrates a specific example of a transmission from a transmit antenna at a transmitter unit.

FIG. 2 is a diagram that graphically illustrates at least some of the aspects of the communications system of the invention. FIG. 2 shows a specific example of a transmission from one of NT transmit antennas at a transmitter unit. In FIG. 2, the horizontal axis is time and the vertical axis is frequency. In this example, the transmission channel includes 16 sub-channels and is used to transmit a sequence of OFDM symbols, with each OFDM symbol covering all 16 sub-channels (one OFDM symbol is indicated at the top of FIG. 2 and includes all 16 sub-bands). A TDM structure is also illustrated in which the data transmission is partitioned into time slots, with each time slot having the duration of, for example, the length of one modulation symbol (i.e., each modulation symbol is used as the TDM interval).

The available sub-channels can be used to transmit signaling, voice, traffic data, and others. In the example shown in FIG. 2, the modulation symbol at time slot 1 corresponds to pilot data, which is periodically transmitted to assist the receiver units to synchronize and perform channel estimation. Other techniques for distributing pilot data over time and frequency can also be used and are within the scope of the present invention. In addition, it may be advantageous to utilize a particular modulation scheme during the pilot interval if all sub-channels are employed (e.g., a PN code with a chip duration of approximately 1/W). Transmission of the pilot modulation symbol typically occurs at a particular frame rate, which is usually selected to be fast enough to permit accurate tracking of variations in the communications link.

The time slots not used for pilot transmissions can then be used to transmit various types of data. For example, sub-channels 1 and 2 may be reserved for the transmission of control and broadcast data to the receiver units. The data on these sub-channels is generally intended to be received by all receiver units. However, some of the messages on the control channel may be user specific, and can be encoded accordingly.

Voice data and traffic data can be transmitted in the remaining sub-channels. For the example shown in FIG. 2, sub-channel 3 at time slots 2 through 9 is used for voice call 1, sub-channel 4 at time slots 2 through 9 is used for voice call 2, sub-channel 5 at time slots 5 through 9 is used for voice call 3, and sub-channel 6 at time slots 7 through 9 is used for voice call 4.

The remaining available sub-channels and time slots may be used for transmissions of traffic data. In the example shown in FIG. 2, data 1 transmission uses sub-channels 5 through 16 at time slot 2 and sub-channels 7 through 16 at time slot 7, data 2 transmission uses sub-channels 5 through 16 at time slots 3 and 4 and sub-channels 6 through 16 at time slots 5, data 3 transmission uses sub-channels 6 through 16 at time slot 6, data 4 transmission uses sub-channels 7 through 16 at time slot 8, data 5 transmission uses sub-channels 7 through 11 at time slot 9, and data 6 transmission uses sub-channels 12 through 16 at time slot 9. Data 1 through 6 transmissions can represent transmissions of traffic data to one or more receiver units.

The communications system of the invention flexibly supports the transmissions of traffic data. As shown in FIG. 2, a particular data transmission (e.g., data 2) may occur over multiple sub-channels and/or multiple time slots, and multiple data transmissions (e.g., data 5 and 6) may occur at one time slot. A data transmission (e.g., data 1) may also occur over non-contiguous time slots. The system can also be designed to support multiple data transmissions on one sub-channel. For example, voice data may be multiplexed with traffic data and transmitted on a single sub-channel.

The multiplexing of the data transmissions can potentially change from OFDM symbol to symbol. Moreover, the communications mode may be different from user to user (e.g., from one voice or data transmission to other). For example, the voice users may use the diversity communications mode, and the data users may use the MIMO communications modes. This concept can be extended to the sub-channel level. For example, a data user may use the MIMO communications mode in sub-channels that have sufficient C/I and the diversity communications mode in remaining sub-channels.

Antenna, frequency, and temporal diversity may be respectively achieved by transmitting data from multiple antennas, on multiple sub-channels in different sub-bands, and over multiple time slots. For example, antenna diversity for a particular transmission (e.g., voice call 1) may be achieved by transmitting the (voice) data on a particular sub-channel (e.g., sub-channel 1) over two or more antennas. Frequency diversity for a particular transmission (e.g., voice call 1) may be achieved by transmitting the data on two or more sub-channels in different sub-bands (e.g., sub-channels 1 and 2). A combination of antenna and frequency diversity may be obtained by transmitting data from two or more antennas and on two or more sub-channels. Temporal diversity may be achieved by transmitting data over multiple time slots. For example, as shown in FIG. 2, data 1 transmission at time slot 7 is a portion (e.g., new or repeated) of the data 1 transmission at time slot 2.

The same or different data may be transmitted from multiple antennas and/or on multiple sub-bands to obtain the desired diversity. For example, the data may be transmitted on: (1) one sub-channel from one antenna, (2) one sub-channel (e.g., sub-channel 1) from multiple antennas, (3) one sub-channel from all NT antennas, (4) a set of sub-channels (e.g., sub-channels 1 and 2) from one antenna, (5), a set of sub-channels from multiple antennas, (6) a set of sub-channels from all NT antennas, or (7) a set of sub-channels from a set of antennas (e.g., sub-channel 1 from antennas 1 and 2 at one time slot, sub-channels 1 and 2 from antenna 2 at another time slot, and so on). Thus, any combination of sub-channels and antennas may be used to provide antenna and frequency diversity.

In accordance with certain embodiments of the invention that provide the most flexibility and are capable of achieving high performance and efficiency, each sub-channel at each time slot for each transmit antenna may be viewed as an independent unit of transmission (i.e., a modulation symbol) that can be used to transmit any type of data such as pilot, signaling, broadcast, voice, traffic data, and others, or a combination thereof (e.g., multiplexed voice and traffic data). In such design, a voice call may be dynamically assigned different sub-channels over time.

Flexibility, performance, and efficiency are further achieved by allowing for independence among the modulation symbols, as described below. For example, each modulation symbol may be generated from a modulation scheme (e.g., M-PSK, M-QAM, and others) that results in the best use of the resource at that particular time, frequency, and space.

A number of constraints may be placed to simplify the design and implementation of the transmitter and receiver units. For example, a voice call may be assigned to a particular sub-channel for the duration of the call, or until such time as a sub-channel reassignment is performed. Also, signaling and/or broadcast data may be designated to some fixed sub-channels (e.g., sub-channel 1 for control data and sub-channel 2 for broadcast data, as shown in FIG. 2) so that the receiver units know a priori which sub-channels to demodulate to receive the data.

Also, each data transmission channel or sub-channel may be restricted to a particular modulation scheme (e.g., M-PSK, M-QAM) for the duration of the transmission or until such time as a new modulation scheme is assigned. For example, in FIG. 2, voice call 1 on sub-channel 3 may use QPSK, voice call 2 on sub-channel 4 may use 16-QAM, data 1 transmission at time slot 2 may use 8-PSK, data 2 transmission at time slots 3 through 5 may use 16-QAM, and so on.

The use of TDM allows for greater flexibility in the transmission of voice data and traffic data, and various assignments of resources can be contemplated. For example, a user can be assigned one sub-channel for each time slot or, equivalently, four sub-channels every fourth time slot, or some other allocations. TDM allows for data to be aggregated and transmitted at designated time slot(s) for improved efficiency.

If voice activity is implemented at the transmitter, then in the intervals where no voice is being transmitted, the transmitter may assign other users to the sub-channel so that the sub-channel efficiency is maximized. In the event that no data is available to transmit during the idle voice periods, the transmitter can decrease (or turn-off) the power transmitted in the sub-channel, reducing the interference levels presented to other users in the system that are using the same sub-channel in another cell in the network. The same feature can be also extended to the overhead, control, data, and other channels.

Allocation of a small portion of the available resources over a continuous time period typically results in lower delays, and may be better suited for delay sensitive services such as voice. Transmission using TDM can provide higher efficiency, at the cost of possible additional delays. The communications system of the invention can allocate resources to satisfy user requirements and achieve high efficiency and performance.

Measuring and Reporting Channel State Information in A MIMO System

Given the complexity of a system using multiple transmit antennas and multiple receive antennas, with the associated dispersive channel effects, the preferred modulation technique is OFDM, which effectively decomposes the channel into a set of non-interfering narrowband channels, or sub-channels. With proper OFDM signal design, a signal transmitted on one subchannel sees "flat fading", i.e., the channel response is effectively constant over the subchannel bandwidth. The channel state information or CSI includes sufficient characterization of the propagation path (i.e., amplitude and phase) between all pairs of transmit and receive antennas for each sub-channel. CSI also includes the information of the relative levels of interference and noise in each sub-channel, that is known as C/I information. The CSI may be embodied in a set of matrices of complex gain values that are descriptive of the conditions of the transmission paths from the transmit antennas to the receive antennas, as described below. With CSI, the transmitter unit pre-conditions the data prior to transmission to receiver unit.

CSI processing is briefly described below. When the CSI is available at the transmitter unit, a simple approach is to decompose the multi-input/multi-output channel into a set of independent channels. Given the channel transfer function at the transmitters, the left eigenvectors may be used to transmit different data streams. The modulation alphabet used with each eigenvector is determined by the available C/I of that mode, given by the eigenvalues. If H is the $N_R \times N_T$ matrix that gives the channel response for the $N_T$ transmitter antenna elements and $N_R$ receiver antenna elements at a specific time, and $\underline{x}$ is the $N_T$-vector of inputs to the channel, then the received signal can be expressed as:

$$\underline{y} = H\underline{x} + \underline{n},$$

where $\underline{n}$ is an $N_R$-vector representing noise plus interference. The eigenvector decomposition of the Hermitian matrix formed by the product of the channel matrix with its conjugate-transpose can be expressed as:

$$H^*H = E\ddot{E}E^*,$$

where the symbol * denotes conjugate-transpose, E is the eigenvector matrix, and $\ddot{E}$ is a diagonal matrix of eigenvalues, both of dimension $N_T \times N_T$. The transmitter converts a set of $N_T$ modulation symbols $\underline{b}$ using the eigenvector matrix E. The transmitted modulation symbols from the $N_T$ transmit antennas can thus be expressed as:

$$\underline{x} = E\underline{b}.$$

For all antennas, the pre-conditioning can thus be achieved by a matrix multiply operation expressed as:

$$\begin{bmatrix} x_1 \\ x_2 \\ \vdots \\ x_{N_T} \end{bmatrix} = \begin{bmatrix} e_{11}, & e_{12}, & & e_{1N_T} \\ e_{21}, & e_{22}, & & e_{2N_T} \\ \vdots & & & \\ e_{N_T 1}, & e_{N_T 1}, & & e_{N_T N_T} \end{bmatrix} \cdot \begin{bmatrix} b_1 \\ b_2 \\ \vdots \\ b_{N_T} \end{bmatrix} \quad \text{Eq (2)}$$

where

- $b_1, b_2, \ldots$ and $b_{N_T}$ are respectively the modulation symbols for a particular sub-channel at transmit antennas $1, 2, \ldots N_T$, where each modulation symbol can be generated using, for example, M-PSK, M-QAM, and so on, as described below;
- E = is the eigenvector matrix related to the transmission loss from transmit antennas to the receive antennas; and $x_1, x_2, \ldots x_{N_T}$ are the pre-conditioned modulation symbols, which can be expressed as:

$$x_1 = b_1 \cdot e_{11} + b_2 \cdot e_{12} + \ldots + b_{N_T} \cdot e_{1N_T},$$
$$x_2 = b_1 \cdot e_{21} + b_2 \cdot e_{22} + \ldots + b_{N_T} \cdot e_{2N_T},$$

and $$x_{N_T} = b_1 \cdot e_{N_T 1} + b_2 \cdot e_{N_T 2} + \ldots + b_{N_T} \cdot e_{N_T N_T}.$$

Since H*H is Hermitian, the eigenvector matrix is unitary. Thus, if the elements of $\underline{b}$ have equal power, the elements of $\underline{x}$ also have equal power. The received signal may then be expressed as:

$$\underline{y} = HE\underline{b} + \underline{n}.$$

The receiver performs a channel-matched-filter operation, followed by multiplication by the right eigenvectors. The result of the channel-matched-filter operation is the vector $\underline{z}$, which can be expressed as:

$$\underline{z} = E^*H^*HE\underline{b} + E^*H^*\underline{n} = \ddot{E}\underline{b} + \hat{n}, \quad \text{Eq.(2)}$$

where the new noise term has covariance that can be expressed as:

$$E(\hat{\underline{nn}}^*) = E(E^*H^*\underline{nn}^*HE) = E^*H^*HE = \Lambda,$$

i.e., the noise components are independent with variance given by the eigenvalues. The C/I of the i-th component of $\underline{z}$ is $\lambda_i$, the i-th diagonal element of $\ddot{E}$.

The transmitter unit can thus select a modulation alphabet (i.e., signal constellation) for each of the eigenvectors based on the C/I that is given by the eigenvalue. Provided that the channel conditions do not change appreciably in the interval between the time the CSI is measured at the receiver and reported and used to precondition the transmission at the transmitter, the performance of the communications system will be equivalent to that of a set of independent AWGN channels with known C/I's.

Figure 1B:
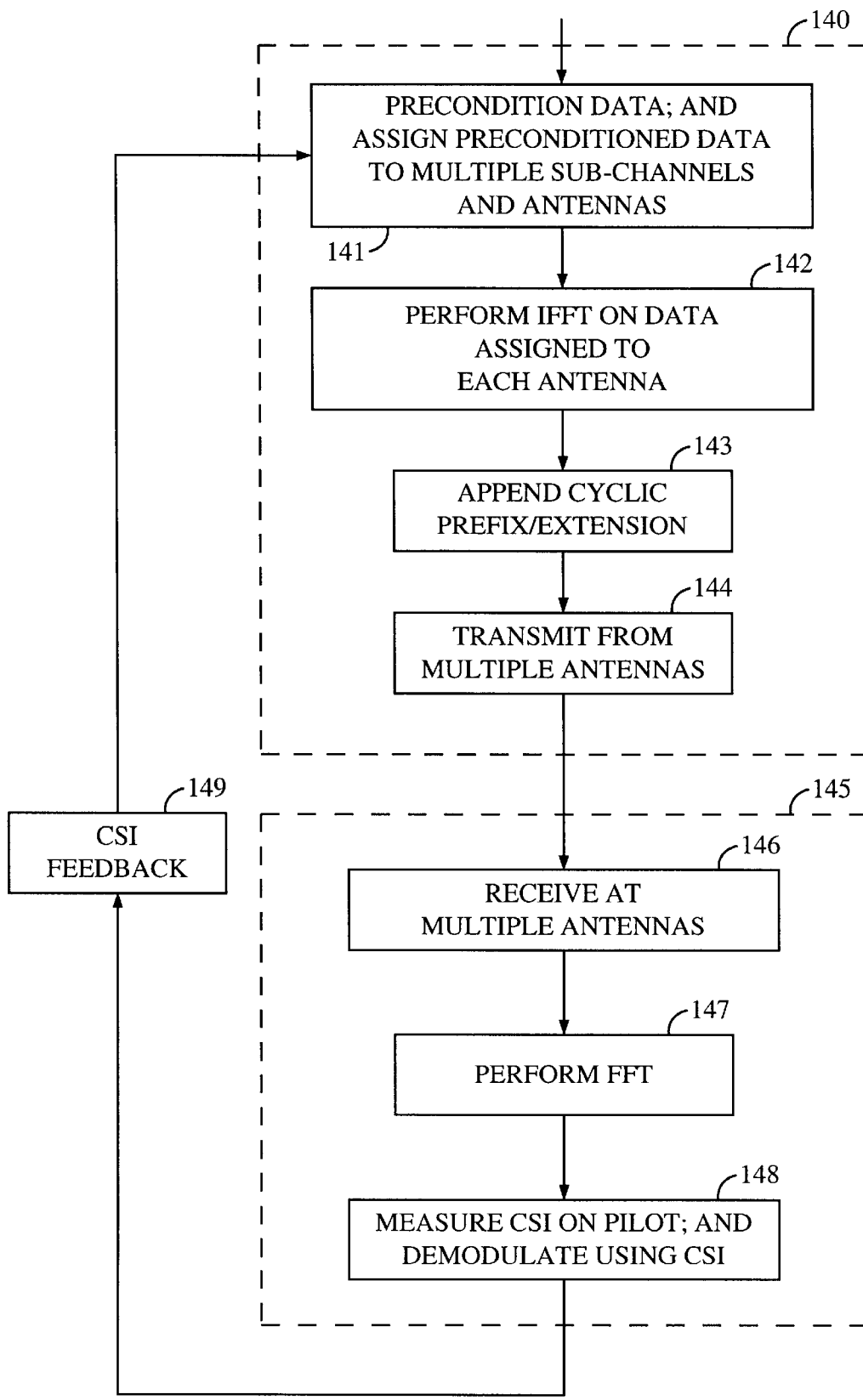
FIG. 1B is a diagram of a OFDM-based MIMO system with feedback of channel state information.

Such a system is illustrated in FIG. 1B. At step 141, the transmitter unit 140 converts data into multiple data sub-channels. Different QAM constellations are employed, depending upon the SNR of the mode and sub-channel. The data for each sub-channel is preconditioned by the eigen-mode matrix for that sub-channel. At step 142, the preconditioned data for a particular antenna undergoes an inverse-Fast Fourier Transform (IFFT) operation to produce a time-domain signal. At step 143, a cyclic extension or a cyclic prefix is appended to the time-domain signal in order to maintain orthogonality among the OFDM sub-channels in the presence of time-dispersion in the propagation channel. One extended symbol value is generated for each OFDM sub-channel and will be referred to hereafter as an OFDM symbol. At step 144, the OFDM symbols are transmitted from the multiple transmit antennas.

Multiple antennas at a receiver unit 145 receive signals at step 146. At step 147, the received signals undergo a Discrete Fourier Transform (DFT) operation to channelize the received signals. At step 148, the data from each sub-channel over all of the receive antennas is processed. At this processing step, information regarding channel characteristics is extracted from the data, and converted into a more compressed format. One compression technique is the use of the conjugate channel response and the eigenmode matrix to reduce the amount of information needed to describe channel characteristics. At step 149, a message containing the compressed channel state information is transmitted from the receiver unit 145 to the transmitter unit 140, which will then be used to precondition further transmissions.

To facilitate the derivation of the CSI, the transmit waveform is made up of known pilot symbols for an initial preamble. The pilot waveforms for different transmit antennas comprise disjoint sets of OFDM subchannels as illustrated for the case when $N_t=4$ in FIG. 1C.

Figure 1C:
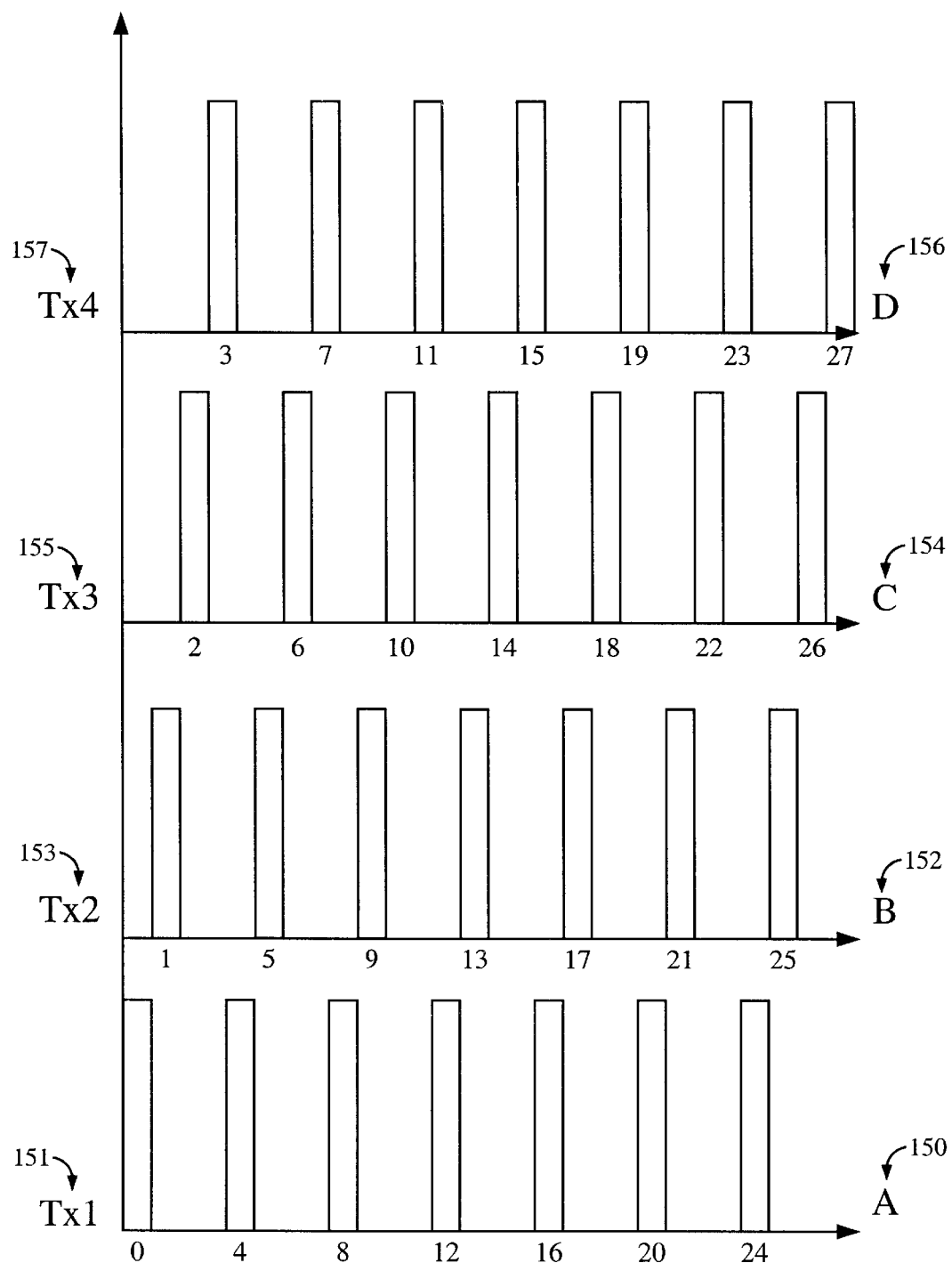
FIG. 1C is a diagram of an exemplary OFDM pilot signal structure that can be used to estimate the channel state information.

With OFDM modulation, the propagation channel is divided into L parallel sub-channels. In order to determine the CSI quickly, an initial preamble consisting entirely of known symbols is transmitted. In order to efficiently distinguish the differing channel responses of the different transmit-receive antenna patterns, the pilot signals are assigned disjoint subsets of sub-channels. FIG. 1C is a diagram of an exemplary OFDM pilot structure composed of disjoint sub-channel subsets. A sub-channel set composed of sub-channels $\{0, 1, 2, \ldots, 2^n-1\}$ is decomposed into four disjoint sub-channel subsets $A=\{0, 4, 8, \ldots, 2^n-4\}$, $B=\{1, 5, 9, \ldots 2^n-3\}$, $C=\{2, 6, 10, \ldots 2^n-2\}$ and $D=\{3, 7, 11, \ldots, 2^n-1\}$. Sub-channel subset A 150 is transmitted on transmit antenna T×1 151, sub-channel subset B 152 is transmitted on transmit antenna T×2 153, sub-channel subset C 154 is transmitted on transmit antenna T×3 155, and sub-channel subset D 156 is transmitted on transmit antenna T×4 157. Generally, each transmit antenna transmits on every $N^{th}$ sub-channel across the channel so that all sub-channels are disjoint between transmit antennas. Known pilot symbols can be transmitted on all sub-channels in a sub-channel subset. The minimum spacing between the sub-channels used by a particular transmit antenna is a function of the channel parameters. If the channel response has a large delay spread, then a close spacing may be necessary. If the number of antennas is large enough that the required spacing may not be achieved for all users with a single OFDM symbol, then a number of consecutive OFDM symbols may be employed, with each antenna assigned a disjoint subset of sub-channels on one or more of the multiple pilot symbols.

From each transmit antenna at a transmitter unit, the receiver unit receives pilot symbols on disjoint sub-channels and makes determinations as to channel characteristics of the disjoint sub-channels. As discussed previously, the receiver unit may have one or more receive antennas. Suppose $\underline{x}=\{x_i, i=1, \ldots, K\}$ are the pilot symbol values that are to be transmitted on K pilot sub-channels for a single transmit antenna. The receiver unit will receive the values $y_{ij}=h_{ij}x_i+n_{ij}$, wherein $h_{ij}$ is the complex channel response for the $i^{th}$ pilot sub-channel received at the $j^{th}$ receive antenna, and $n_{ij}$ is noise. From this relationship, the receiver unit can determine noisy estimates of the channel response of K sub-channels of a single transmit antenna. These noisy estimates may be used to derive estimates for all sub-channels of the propagation channel through a number of different methods, such as simple interpolation to more complex estimation using a priori information on the channel dispersion and noise level. The estimates may be improved by transmitting pilot symbols over consecutive OFDM symbols and then averaging the estimates for each consecutive OFDM symbol.

Estimates are generated at each receive antenna for each transmit antenna broadcasting pilot symbols. The CSI for the complete propagation channel can be represented by the set of channel response matrices $\{H_i, i=1, 2, \ldots, 2^n\}$, where matrix $H_i$ is associated with the $i^{th}$ sub-channel, and the elements of each matrix $H_i$ are $\{h_{ijk}, j=1, \ldots, N_t, k=1, \ldots N_r\}$, the complex channel response values for each of the $N_t$ transmit and $N_r$ receive antennas.

The use of disjoint sub-channel subsets can further be applied in a system wherein multiple links, e.g., a propagation channel from a transmitter unit to one or more receiver units, are located in close proximity. In a system where a base station transmits signals according to sectors, the transmission area of a sector can overlap the transmission area of another sector. In an ideal base station, transmit antennas in each sector transmit signals in a direction that is completely disjoint from the directions assigned to the transmit antennas of the other sectors. Unfortunately, overlapping areas exist in most sectored base stations. Using this embodiment of the invention, all transmit antennas of a base station are assigned disjoint subsets of sub-channels to avoid interference between the sectors of that base station. Similarly, neighboring base stations may also be the cause of significant interference, and disjoint sets of sub-channels may be assigned among base stations.

In general, the computation of the channel response can be made for every link that is assigned a disjoint sub-channel subset, in the same manner as the response is computed for the principal link. However, a reduced amount of CSI from these interfering links may be reported to the transmitter unit. For example, information as to the average total interference level of neighboring links can be transmitted and used to determine the supportable data rate of the principal link. If several interfering links dominate the average total interference level, then the interference information of these links may be reported individually to the system in order to determine a more efficient grouping of sub-channels in each disjoint sub-channel subset.

Other CSI information that can be conveyed to the transmitter unit is the total measured power in sub-channels not assigned to the principal link. The total measured power of sub-channels assigned to neighboring links gives an estimate of the total interference plus noise power. If several OFDM symbols are used as the pilot symbol, then the mean measured channel response and the actual received signal values may be used to make a direct estimate of the total noise in a given sub-channel.

In general, the assignment of sub-channels for a network of base stations should follow a pattern of "frequency-reuse," wherein the same sub-channels are used only when the links are sufficiently separated by distance. If a large number of links are interfering with each other, then the number of OFDM sub-channels may be inadequate to allow the assignment of sub-channels for every pilot OFDM symbol. In this circumstance, transmit antennas may be assigned sub-channels for every P-th pilot symbol, where P is an integer value greater than one (1).

In another embodiment of the invention, the OFDM scheme is designed to create OFDM symbol values that minimize or eliminate interference between transmit antennas that use either identical sub-channels or disjoint sub-channels. An orthogonal code, such as Walsh coding, can be used to transform Q pilot signals into Q orthogonal signals representative of the pilot signals. In the case where a Walsh code is used, the number of pilot signals would be a power of two. The use of orthogonal codes can be used together with the previously discussed disjoint sub-channel subsets in order to reduce interference from neighboring links. For example, in a 4×4 MIMO system with a system bandwidth of approximately 1 MHz, assume that 256 OFDM sub-channels are to be used. If the multipath is limited to ten microseconds, the disjoint sub-channels carrying pilot symbols should be spaced approximately 50 kHz apart or closer. Each sub-channel is approximately 4 kHz wide so that a spacing of twelve sub-channels is 48 kHz wide. If the OFDM sub-channels are divided into twelve sets of twenty sub-channels each, sixteen are left unused. Two consecutive OFDM symbols are used as a pilot signal, and orthogonal coding on these two symbols is employed. Hence, there are twenty-four different orthogonal pilot assignments. These twenty-four orthogonal pilots are assigned to different transmit antennas and links to minimize interference.

In another embodiment of the invention, a large number of periodic OFDM symbols can be used as pilot data. The number of OFDM symbols must be large enough so that accurate measurements of interference levels from a large number of different transmit antennas can be made. These average interference levels would be used to set up system-wide constraints on simultaneous transmissions from various sites, i.e., an adaptive blanking scheme to allow all users nearly equivalent performance.

In an alternate embodiment of the invention, the CSI of a MIMO propagation channel can be determined and transmitted for a MIMO system that does not utilize OFDM symbols as pilot signals. Instead, a Maximal-Length Shift Register sequence (m-sequence) can be used to sound the propagation channel. An m-sequence is the output of a shift register with feedback. M-sequences have desirable autocorrelation properties, including the property that correlation over a full period of the sequence with any non-zero circular shift of the sequence yields the value −1, wherein the sequence values are +/−1. Hence, the correlation at zero shift is R, wherein R is the length of the sequence. In order to maintain desirable properties such as correlation in the presence of multipath, a portion of the sequence equal to the delay spread of the channel must be repeated.

For example, if it is known that the channel multipath is limited to some time $\tau_m$ and the length of the pilot sequence is at least $R\tau_m$, then R different shifts of the same m-sequence may be used with only minimal mutual interference. These R different shifts are assigned to different transmit antennas of a base station and other base stations that are the cause of major interference.

Links in the MIMO system that are distantly separated can be assigned different m-sequences. The cross-correlation properties of different m-sequences do not exhibit the minimal correlation properties of a single sequence and its shifts, but different m-sequences behave more or less like random sequences and provide an average correlation level of $\sqrt{R}$ where R is the sequence length. This average correlation level is generally adequate for use in a MIMO system, because of the separation between the links.

A shift register with feedback generates all possible m-sequences, so that sequences are merely shifted versions of a single code word of length $R=2^m-1$, where m is a positive integer value. Hence, a limited number of different binary m-sequences exist. In order to avoid reuse of the same m-sequence in an area where significant interference may result, filtered versions of longer m-sequences can be used. A filtered version of an m-sequence is no longer binary, but will still display the same basic correlation properties.

For example, suppose that the pilot sequence is to be transmitted at a 1 MHz rate, and that the multipath is limited to ten microseconds. Assume that a base station has three sectors, wherein four transmit antennas are assigned to each sector for a total of twelve transmit antennas per site. If a length 127 m-sequence is employed, then twelve different shifts of the sequence may be assigned to the antennas of a single base station, with relative shifts of ten samples each. The total length of the transmitted pilot is then 137 microseconds, which is a full period of the sequence plus ten additional samples to accommodate the multipath spread.

Then different base stations can be assigned different m-sequences, with m-sequences repeated in a code reuse pattern designed to minimize the effects of interference from the same m-sequence.

The embodiments of the invention discussed herein have been directed to the design and transmission of pilot signals that will allow a person skilled in the art to derive characteristics of the propagation channel and to report such characteristics to the transmission site. However, the full CSI is a large amount of information and also highly redundant. Many methods are available for compressing the amount of CSI information to be transmitted. One method discussed previously is the use of the Hermatian matrix H*H, wherein H is the channel response as determined at the receiver unit. The Hermation matrix H*H can be reported to the transmitter unit and be used to precondition transmissions. Due to the properties of Hermitian matrices, only half of the matrix elements need to be transmitted, such as the complex lower triangular portion of the matrix H*H, and the real-valued diagonal. Additional efficiencies are realized if the number of receive antennas is larger than the number of transmit antennas. Another method to reduce the amount of information transmitted to the transmitter unit on the reverse link is to report only a subset of the channel response matrices $H_i$ to the transmitter unit, from which the unreported channel response matrices can be determined through interpolation schemes. In another method, a functional representation of the channel response across the sub-channels may be derived for each transmit/receive antenna pair, e.g., a polynomial function representative of the channel response can be generated. The coefficients of the polynomial function are then transmitted to the transmitter unit.

As an alternative to these methods for compressing CSI information, one embodiment of the invention is directed to the transmission of a time-domain representation of the channel response, which is the channel impulse response. If a time-domain representation of the channel response is simple, as in cases where there are only two or three multipath components, an inverse FFT can be performed upon the set of channel frequency responses. The inverse FFT operation can be performed for each link between a transmit/receive antenna pair. The resulting channel impulse responses are then translated into a set of amplitudes and delays that are reported to the transmitter.

As discussed previously, there is a cost associated with the transmission of CSI in the reverse link, which is reduced when the above embodiments of the invention are implemented in the MIMO system. Another method for reducing the cost is to select users according to the short term average of their CSI requirements. The CSI requirements change as the channel fades, so improved efficiency on the reverse link is achieved if users estimate the quantity of CSI required, and inform the base station at intervals that may be periodic or a periodic, depending on the rate of change of the propagation channel observed by the user. The base station may then include this factor in scheduling the use of the forward and reverse links. Scheduling can be arranged so that users associated with slowly changing propagation channels report less frequently than users associated with quickly changing propagation channels. The base station can also arrange the scheduling to take into account factors such as the number of system users and fairness.

In another aspect of this embodiment of the invention, a time interval can be assigned so that CSI updates in a long transmission period can be adjusted according to the actual changes in the propagation channel. Changes in the propagation channel can be monitored at the receiving site in one of a number of possible ways. For example, the difference between the soft decision on the symbols and the closest QAM constellation value can be determined and used as a criterion, or the relative sizes of decoder metrics can also be used. When the quality of a given criterion falls below a predetermined threshold, an update to the CSI is reported to the transmitter unit.

The overall multipath power-delay profile of a link changes very slowly because the average power observed at various delays remains constant, even though channel fading may occur frequently. Hence, the amount of CSI required to characterize a link can vary substantially from link to link. To optimize performance, the coding of the CSI is tailored to the specific link requirements. If the CSI is sent in frequency-domain form, i.e., a set of channel response matrices which are to be interpolated, then links with little multipath require only a small set of channel response matrices.

Figure 3:
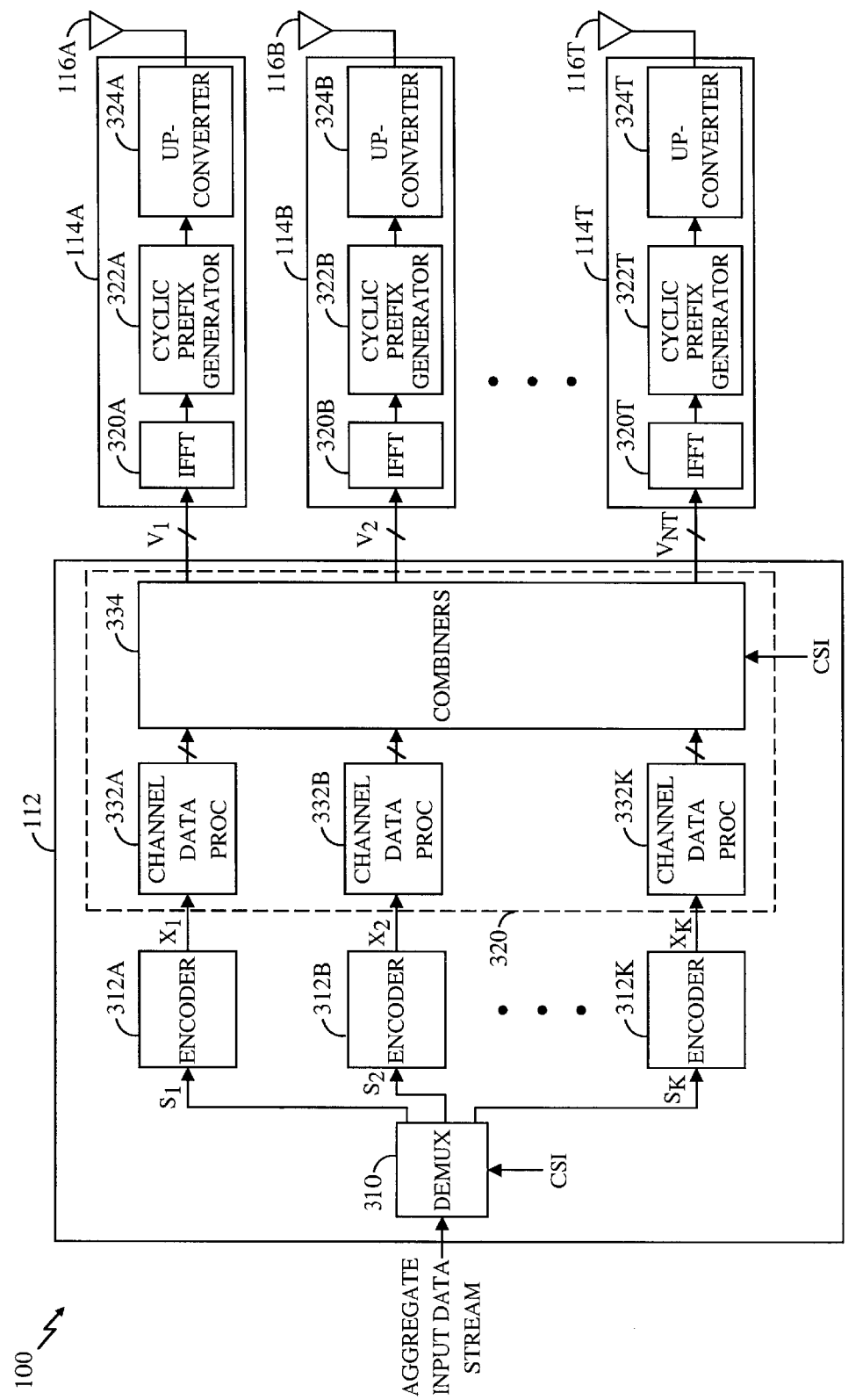
FIG. 3 is a block diagram of a data processor and a modulator of the communications system shown in FIG. 1A.

Structural Components of a High Efficiency, High Performance Communication System FIG. 3 is a block diagram of a data processor 112 and modulator 114 of system 110 in FIG. 1A. The aggregate input data stream that includes all data to be transmitted by system 110 is provided to a demultiplexer (DEMUX) 310 within data processor 112. Demultiplexer 310 demultiplexes the input data stream into a number of (K) channel data streams, $S_1$ through $S_k$. Each channel data stream may correspond to, for example, a signaling channel, a broadcast channel, a voice call, or a traffic data transmission. Each channel data stream is provided to a respective encoder 312 that encodes the data using a particular encoding scheme.

The encoding may include error correction coding or error detection coding, or both, used to increase the reliability of the link. More specifically, such encoding may include, for example, interleaving, convolutional coding, Turbo coding, Trellis coding, block coding (e.g., Reed-Solomon coding), cyclic redundancy check (CRC) coding, and others. Turbo encoding is described in further detail in U.S. Pat. No. 6,304,991, filed Dec. 4, 1998, entitled "Turbo Code Interleaver Using Linear Congruential Sequences," which issued Oct. 16, 2001 to Ling et al., and in a document entitled, "The cdma2000 ITU-R RTT Candidate Submission," hereinafter referred to as the IS-2000 standard, both of which are incorporated herein by reference.

The encoding can be performed on a per channel basis, i.e., on each channel data stream, as shown in FIG. 3. However, the encoding may also be performed on the aggregate input data stream, on a number of channel data streams, on a portion of a channel data stream, across a set of antennas, across a set of sub-channels, across a set of sub-channels and antennas, across each sub-channel, on each modulation symbol, or on some other unit of time, space, and frequency. The encoded data from encoders 312a through 312k is then provided to a data processor 320 that processes the data to generate modulation symbols.

In one implementation, data processor 320 assigns each channel data stream to one or more sub-channels, at one or more time slots, and on one or more antennas. For example, for a channel data stream corresponding to a voice call, data processor 320 may assign one sub-channel on one antenna (if transmit diversity is not used) or multiple antennas (if transmit diversity is used) for as many time slots as needed for that call. For a channel data stream corresponding to a signaling or broadcast channel, data processor 320 may assign the designated sub-channel(s) on one or more antennas, again depending on whether transmit diversity is used. Data processor 320 then assigns the remaining available resources for channel data streams corresponding to data transmissions. Because of the bursty nature of data transmissions and the greater tolerance to delays, data processor 320 can assign the available resources such that the system goals of high performance and high efficiency are achieved. The data transmissions are thus "scheduled" to achieve the system goals.

After assigning each channel data stream to its respective time slot(s), sub-channel(s), and antenna(s), the data in the channel data stream is modulated using multi-carrier modulation. OFDM modulation is used to provide numerous advantages. In one implementation of OFDM modulation, the data in each channel data stream is grouped to blocks, with each block having a particular number of data bits. The data bits in each block are then assigned to one or more sub-channels associated with that channel data stream.

The bits in each block are then demultiplexed into separate sub-channels, with each of the sub-channels conveying a potentially different number of bits (i.e., based on C/I of the sub-channel and whether MIMO processing is employed). For each of these sub-channels, the bits are-grouped into modulation symbols using a particular modulation scheme (e.g., M-PSK or M-QAM) associated with that sub-channel. For example, with 16-QAM, the signal constellation is composed of 16 points in a complex plane (i.e., a+j*b), with each point in the complex plane conveying 4 bits of information. In the MIMO processing mode, each modulation symbol in the sub-channel represents a linear combination of modulation symbols, each of which may be selected from a different constellation.

The collection of L modulation symbols form a modulation symbol vector V of dimensionality L. Each element of the modulation symbol vector V is associated with a specific sub-channel having a unique frequency or tone on which the modulation symbols is conveyed. The collection of these L modulation symbols are all orthogonal to one another. At each time slot and for each antenna, the L modulation symbols corresponding to the L sub-channels are combined into an OFDM symbol using an inverse fast Fourier transform (IFFT). Each OFDM symbol includes data from the channel data streams assigned to the L sub-channels.

OFDM modulation is described in further detail in a paper entitled "Multicarrier Modulation for Data Transmission: An Idea Whose Time Has Come," by John A. C. Bingham, IEEE Communications Magazine, May 1990, which is incorporated herein by reference.

Data processor 320 thus receives and processes the encoded data corresponding to K channel data streams to provide $N_T$ modulation symbol vectors, $V_1$ through $V_{N_T}$, one modulation symbol vector for each transmit antenna. In some implementations, some of the modulation symbol vectors may have duplicate information on specific sub-channels intended for different transmit antennas. The modulation symbol vectors $V_1$ through $V_{N_T}$ are provided to modulators 114a through 114t, respectively.

In FIG. 3, each modulator 114 includes an IFFT 320, cycle prefix generator 322, and an upconverter 324. IFFT 320 converts the received modulation symbol vectors into their time-domain representations called OFDM symbols. IFFT 320 can be designed to perform the IFFT on any number of sub-channels (e.g., 8, 16, 32, and so on). Alternatively, for each modulation symbol vector converted to an OFDM symbol, cycle prefix generator 322 repeats a portion of the time-domain representation of the OFDM symbol to form the transmission symbol for the specific antenna. The cyclic prefix insures that the transmission symbol retains its orthogonal properties in the presence of multipath delay spread, thereby improving performance against deleterious path effects, as described below. The implementation of IFFT 320 and cycle prefix generator 322 is known in the art and not described in detail herein.

The time-domain representations from each cycle prefix generator 322 (i.e., the transmission symbols for each antenna) are then processed by upconverter 324, converted into an analog signal, modulated to a RF frequency, and conditioned (e.g., amplified and filtered) to generate an RF modulated signal that is then transmitted from the respective antenna 116.

FIG. 3 also shows a block diagram of a data processor 320. The encoded data for each channel data stream (i.e., the encoded data stream, X) is provided to a respective channel data processor 332. If the channel data stream is to be transmitted over multiple sub-channels and/or multiple antennas (without duplication on at least some of the transmissions), channel data processor 332 demultiplexes the channel data stream into a number of (up to $L \cdot N_T$) data sub-streams. Each data sub-stream corresponds to a transmission on a particular sub-channel at a particular antenna. In typical implementations, the number of data sub-streams is less than $L \cdot N_T$ since some of the sub-channels are used for signaling, voice, and other types of data. The data sub-streams are then processed to generate corresponding sub-streams for each of the assigned sub-channels that are then provided to combiners 334. Combiners 334 combine the modulation symbols designated for each antenna into modulation symbol vectors that are then provided as a modulation symbol vector stream. The $N_T$ modulation symbol vector streams for the $N_T$ antennas are then provided to the subsequent processing blocks (i.e., modulators 114).

In a design that provides the most flexibility, best performance, and highest efficiency, the modulation symbol to be transmitted at each time slot, on each sub-channel, can be individually and independently selected. This feature allows for the best use of the available resource over all three dimensions—time, frequency, and space. The number of data bits transmitted by each modulation symbol may thus differ.

Figure 4A:
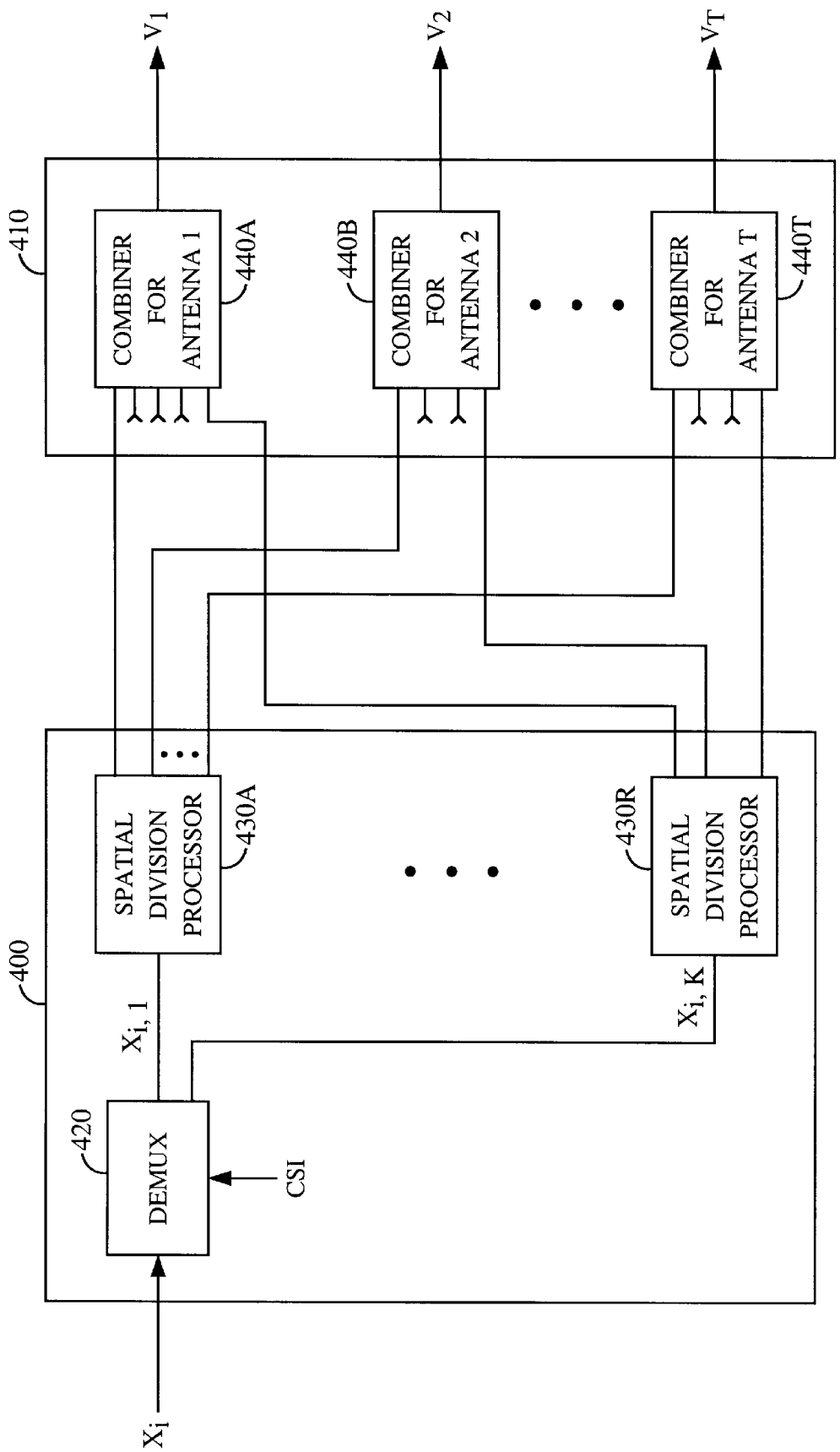
FIGS. 4A and 4B are block diagrams of two versions of a channel data processor that can be used for processing one channel data stream such as control, broadcast, voice, or traffic data.

FIG. 4A is a block diagram of a channel data processor 400 that can be used for processing one channel data stream. Channel data processor 400 can be used to implement one channel data processor 332 in FIG. 3. The transmission of a channel data stream may occur on multiple sub-channels (e.g., as for data 1 in FIG. 2) and may also occur from multiple antennas. The transmission on each sub-channel and from each antenna can represent non-duplicated data.

Within channel data processor 400, a demultiplexer 420 receives and demultiplexes the encoded data stream, $X_i$, into a number of sub-channel data streams, $X_{i,1}$ through $X_{i,K}$, one sub-channel data stream for each sub-channel being used to transmit data. The data demultiplexing can be uniform or non-uniform. For example, if some information about the transmission paths is known (i.e., full CSI or partial CSI is known), demultiplexer 420 may direct more data bits to the sub-channels capable of transmitting more bps/Hz. However, it no CSI is known, demultiplexer 420 may uniformly direct approximately equal numbers of bits to each of the allocated sub-channels.

Each sub-channel data stream is then provided to a respective spatial division processor 430. Each spatial division processor 430 may further demultiplex the received sub-channel data stream into a number of (up to $N_T$) data sub-streams, one data sub-stream for each antenna used to transmit the data. Thus, after demultiplexer 420 and spatial division processor 430, the encoded data stream $X_i$ may be demultiplexed into up to $L \cdot N_T$ data sub-streams to be transmitted on up to L sub-channels from up to $N_T$ antennas.

At any particular time slot, up to $N_T$ modulation symbols may be generated by each spatial division processor 430 and provided to $N_T$ combiners 440a through 440t. For example, spatial division processor 430a assigned to sub-channel 1 may provide up to $N_T$ modulation symbols for sub-channel 1 of antennas 1 through $N_T$. Similarly, spatial division processor 430r assigned to sub-channel k may provide up to $N_T$ symbols for sub-channel k of antennas 1 through $N_T$. Each combiner 440 receives the modulation symbols for the L sub-channels, combines the symbols for each time slot into a modulation symbol vector, and provides the modulation symbol vectors as a modulation symbol vector stream, V, to the next processing stage (e.g., modulator 114).

Channel data processor 400 may also be designed to provide the necessary processing to implement the full-CSI or partial-CSI processing modes described above. The CSI processing may be performed based on the available CSI information and on selected channel data streams, sub-channels, antennas, etc. The CSI processing may also be enabled and disabled selectively and dynamically. For example, the CSI processing may be enabled for a particular transmission and disabled for some other transmissions. The CSI processing may be enabled under certain conditions, for example, when the transmission link has adequate C/I.

Channel data processor 400 in FIG. 4A provides a high level of flexibility. However, such flexibility is typically not needed for all channel data streams. For example, the data for a voice call is typically transmitted over one sub-channel for the duration of the call, or until such time as the sub-channel is reassigned. The design of the channel data processor can be greatly simplified for these channel data streams.

Figure 4B:
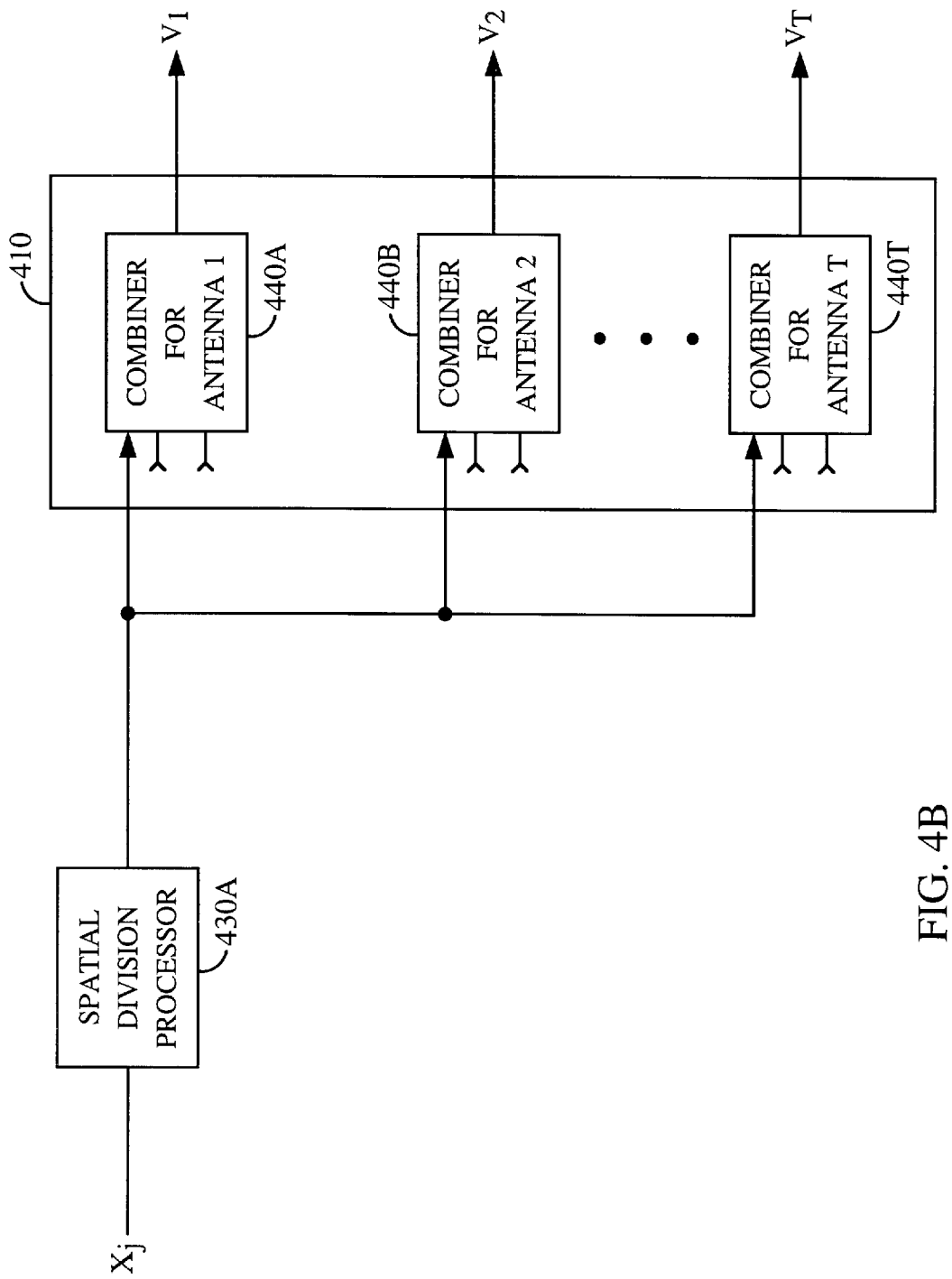

FIG. 4B is a block diagram of the processing that can be employed for one channel data stream such as overhead data, signaling, voice, or traffic data. A spatial division processor 450 can be used to implement one channel data processor 332 in FIG. 3 and can be used to support a channel data stream such as, for example, a voice call. A voice call is typically assigned to one sub-channel for multiple time slots (e.g., voice 1 in FIG. 2) and may be transmitted from multiple antennas. The encoded data stream, $X_j$, is provided to spatial division processor 450 that groups the data into blocks, with each block having a particular number of bits that are used to generate a modulation symbol. The modulation symbols from spatial division processor 450 are then provided to one or more combiners 440 associated with the one or more antennas used to transmit the channel data stream.

A specific implementation of a transmitter unit capable of generating the transmit signal shown in FIG. 2 is now described for a better understanding of the invention. At time slot 2 in FIG. 2, control data is transmitted on sub-channel 1, broadcast data is transmitted on sub-channel 2, voice calls 1 and 2 are assigned to sub-channels 3 and 4, respectively, and traffic data is transmitted on sub-channels 5 through 16. In this example, the transmitter unit is assumed to include four transmit antennas (i.e., $N_T=4$) and four transmit signals (i.e., four RF modulated signals) are generated for the four antennas.

Figure 5A:
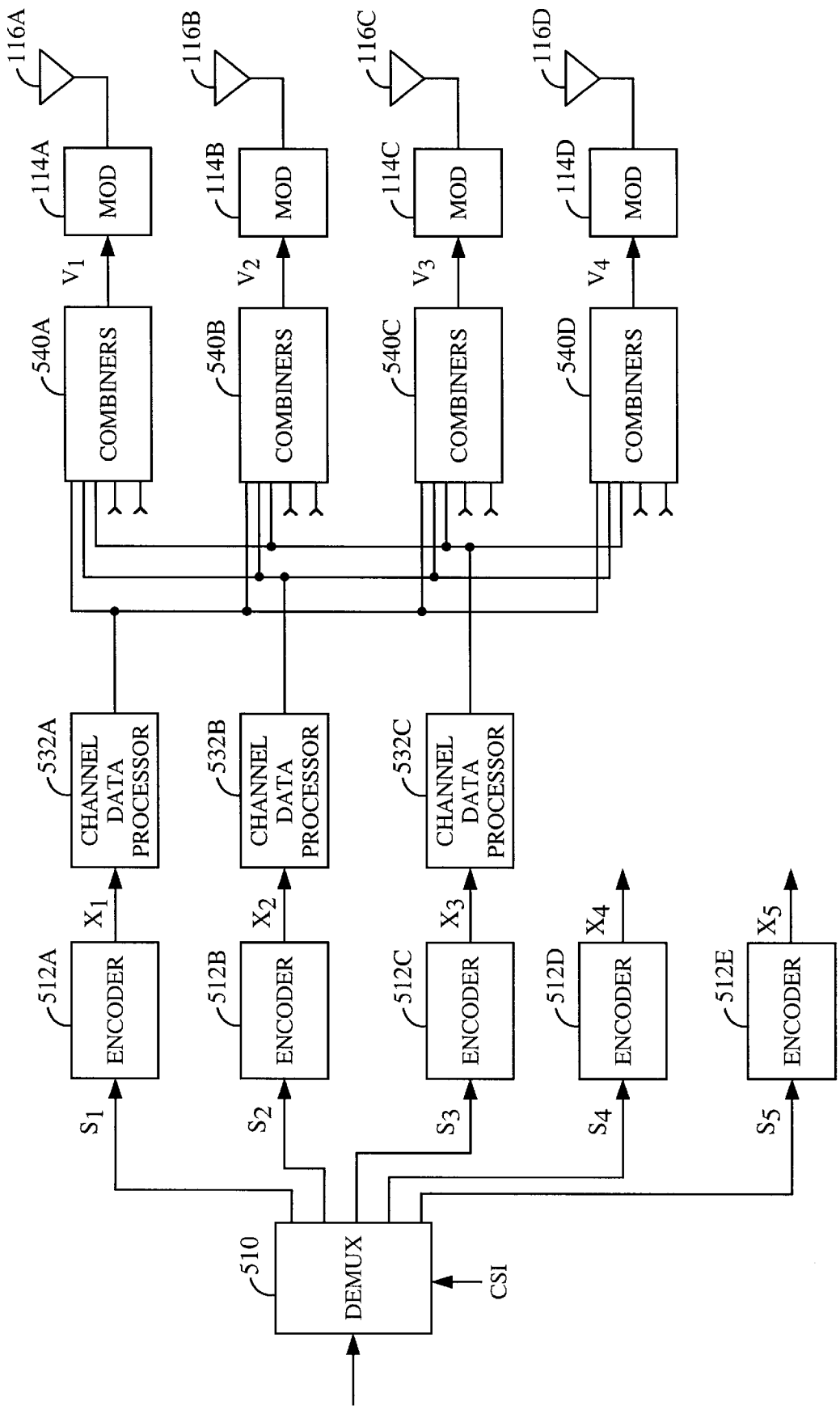
FIGS. 5A through 5C are block diagrams of the processing units that can be used to generate the transmit signal shown in FIG. 2.

FIG. 5A is a block diagram of a portion of the processing units that can be used to generate the transmit signal for time slot 2 in FIG. 2. The input data stream is provided to a demultiplexer (DEMUX) 510 that demultiplexes the stream into five channel data streams, $S_1$ through $S_5$, corresponding to control, broadcast, voice 1, voice 2, and data 1 in FIG. 2. Each channel data stream is provided to a respective encoder 512 that encodes the data using an encoding scheme selected for that stream.

In this example, channel data streams $S_1$ through $S_3$ are transmitted using transmit diversity. Thus, each of the encoded data streams $X_1$ through $X_3$ is provided to a respective channel data processor 532 that generates the modulation symbols for that stream. The modulation symbols from each of the channel data processors 532a through 532c are then provided to all four combiners 540a through 540d. Each combiner 540 receives the modulation symbols for all 16 sub-channels designated for the antenna associated with the combiner, combines the symbols on each sub-channel at each time slot to generate a modulation symbol vector, and provides the modulation symbol vectors as a modulation symbol vector stream, V, to an associated modulator 114. As indicated in FIG. 5A, channel data stream $S_1$ is transmitted on sub-channel 1 from all four antennas, channel data stream $S_2$ is transmitted on sub-channel 2 from all four antennas, and channel data stream $S_3$ is transmitted on sub-channel 3 from all four antennas.

Figure 5B:
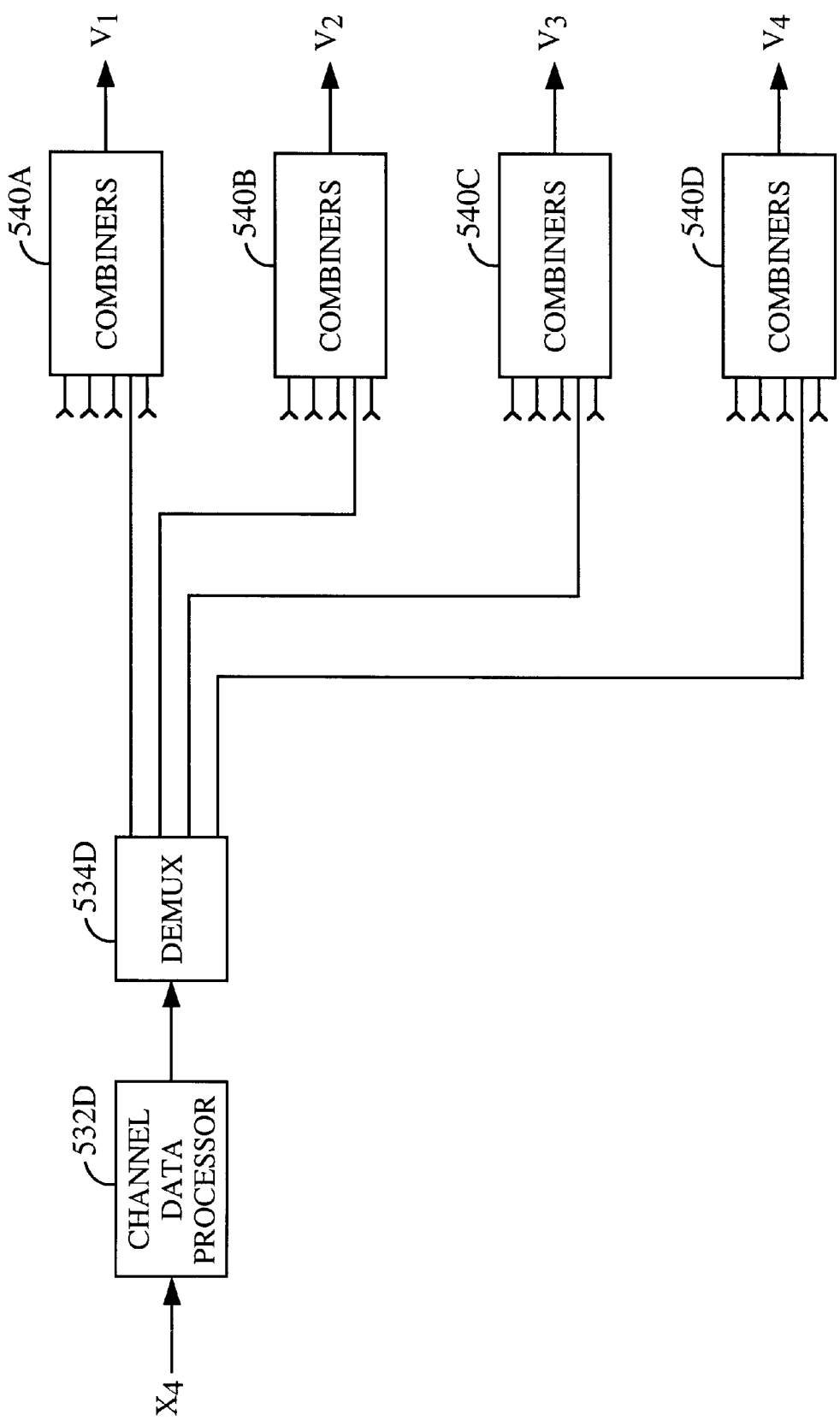

FIG. 5B is a block diagram of a portion of the processing units used to process the encoded data for channel data stream $S_4$. In this example, channel data stream $S_4$ is transmitted using spatial diversity (and not transmit diversity as used for channel data streams $S_1$ through $S_3$). With spatial diversity, data is demultiplexed and transmitted (concurrently in each of the assigned sub-channels or over different time slots) over multiple antennas. The encoded data stream $X_4$ is provided to a channel data processor 532d that generates the modulation symbols for that stream. The modulation symbols in this case are linear combinations of modulation symbols selected from symbol alphabets that correspond to each of the eigenmodes of the channel. In this example, there are four distinct eigenmodes, each of which is capable of conveying a different amount of information. As an example, suppose eigenmode 1 has a C/I that allows 64-QAM (6 bits) to be transmitted reliably, eigenmode 2 permits 16-QAM (4 bits), eigenmode 3 permits QPSK (2 bits) and eigenmode 4 permits BPSK (1 bit) to be used. Thus, the combination of all four eigenmodes allows a total of 13 information bits to be transmitted simultaneously as an effective modulation symbol on all four antennas in the same sub-channel. The effective modulation symbol for the assigned sub-channel on each antenna is a linear combination of the individual symbols associated with each eigenmode, as described by the matrix multiply given in equation (1) above.

Figure 5C:
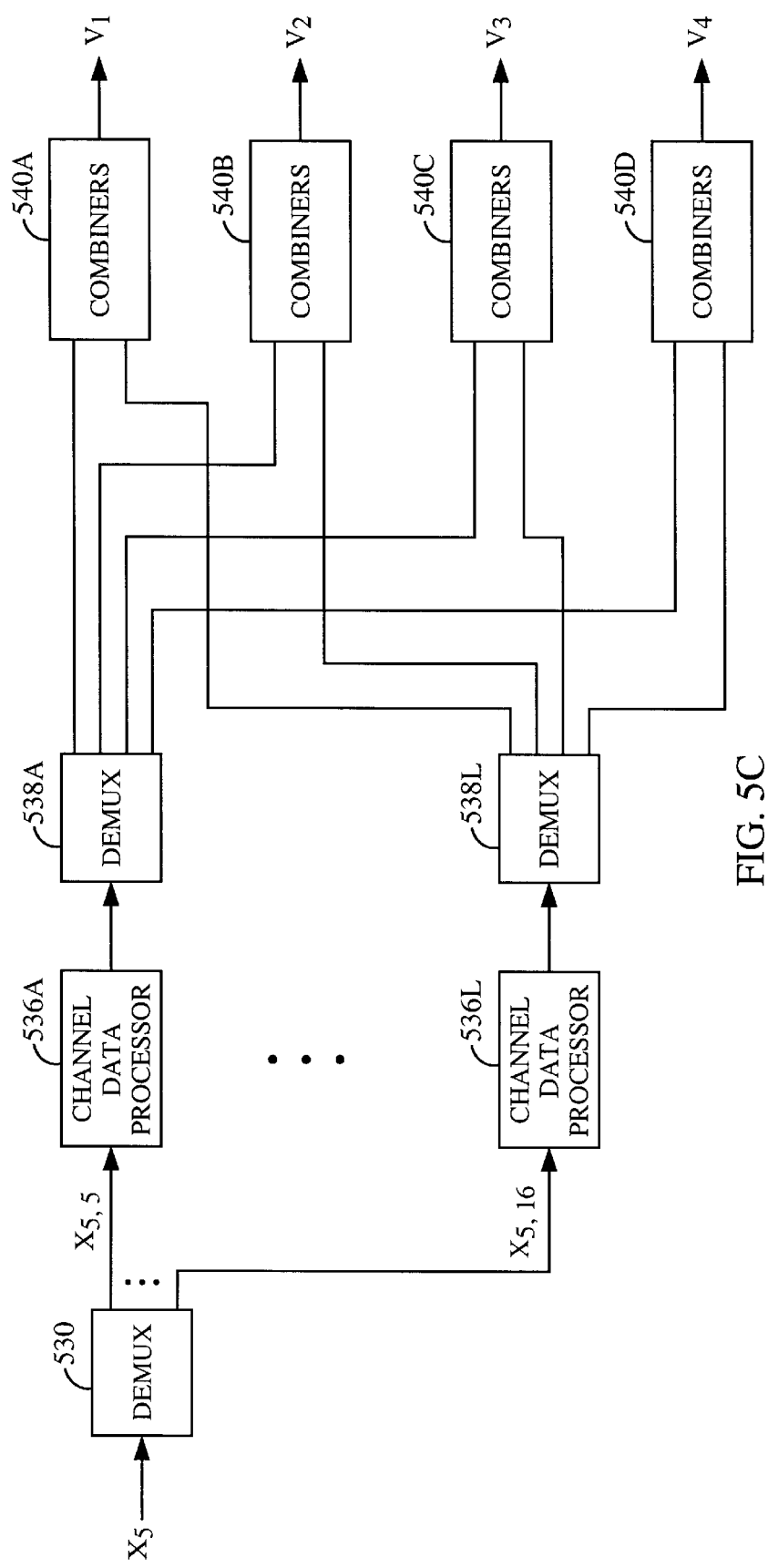

FIG. 5C is a block diagram of a portion of the processing units used to process channel data stream $S_5$. The encoded data stream $X_5$ is provided to a demultiplexer (DEMUX) 530 that demultiplexes the stream $X_5$ into twelve sub-channel data streams, $X_{5,5}$ through $X_{5,16}$, one sub-channel data stream for each of the allocated sub-channels 5 through 16. Each sub-channel data stream is then provided to a respective sub-channel data processor 536 that generates the modulation symbols for the associated sub-channel data stream. The sub-channel symbol stream from sub-channel data processors 536a through 536l are then provided to demultiplexers 538a through 538l, respectively. Each demultiplexer 538 demultiplexes the received sub-channel symbol stream into four symbol sub-streams, with each symbol substream corresponding to a particular sub-channel at a particular antenna. The four symbol sub-streams from each demultiplexer 538 are then provided to the four combiners 540a through 540d.

In FIG. 5C, a sub-channel data stream is processed to generate a sub-channel symbol stream that is then demultiplexed into four symbol sub-streams, one symbol sub-stream for a particular sub-channel of each antenna. This implementation is a different from that described for FIG. 4A. In FIG. 4A, the sub-channel data stream designated for a particular sub-channel is demultiplexed into a number of data sub-streams, one data sub-stream for each antenna, and then processed to generate the corresponding symbol sub-streams. The demultiplexing in FIG. 5C is performed after the symbol modulation whereas the demultiplexing in FIG. 4A is performed before the symbol modulation. Other implementations may also be used and are within the scope of the present invention.

Each combination of sub-channel data processor 536 and demultiplexer 538 in FIG. 5C performs in similar manner as the combination of sub-channel data processor 532d and demultiplexer 534d in FIG. 5B. The rate of each symbol sub-stream from each demultiplexer 538 is, on the average, a quarter of the rate of the symbol stream from the associated channel data processor 536.

Figure 6:
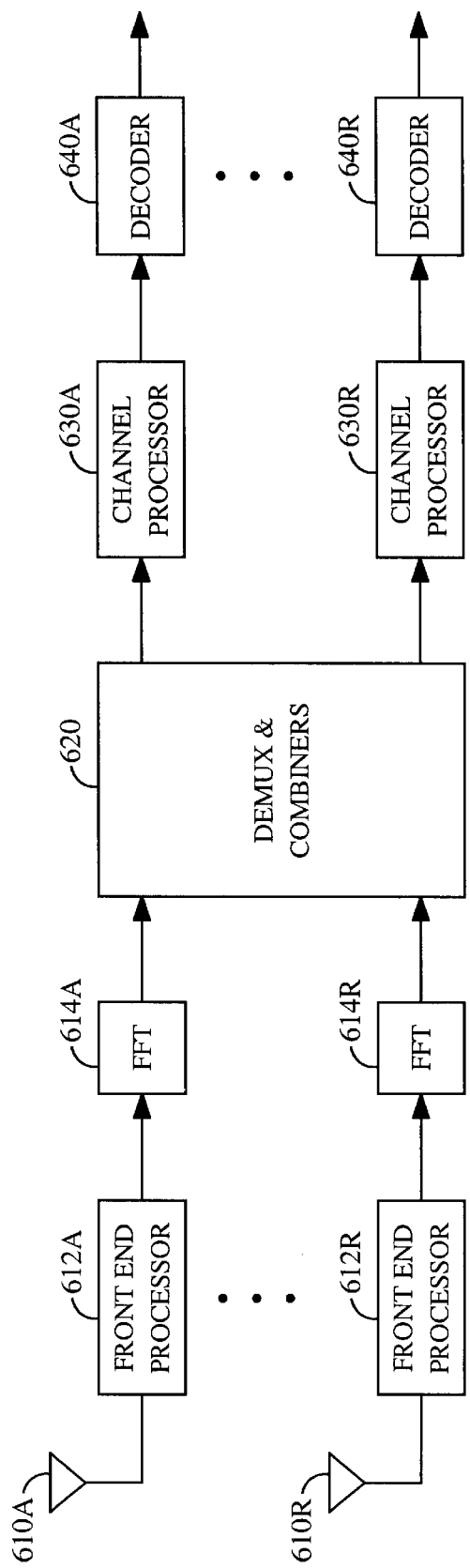
FIG. 6 is a block diagram of a receiver unit, having multiple receive antennas, which can be used to receive one or more channel data streams.

FIG. 6 is a block diagram of a receiver unit 600, having multiple receive antennas, which can be used to receive one or more channel data streams. One or more transmitted signals from one or more transmit antennas can be received by each of antennas 610a through 610r and routed to a respective front end processor 612. For example, receive antenna 610a may receive a number of transmitted signals from a number of transmit antennas, and receive antenna 610r may similarly receive multiple transmitted signals. Each front end processor 612 conditions (e.g., filters and amplifies) the received signal, downconverts the conditioned signal to an intermediate frequency or baseband, and samples and quantizes the downconverted signal. Each front end processor 612 typically further demodulates the samples associated with the specific antenna with the received pilot to generate "coherent" samples that are then provided to a respective FFT processor 614, one for each receive antenna.

Each FFT processor 614 generates transformed representations of the received samples and provides a respective stream of modulation symbol vectors. The modulation symbol vector streams from FFT processors 614a through 614r are then provided to demultiplexer and combiners 620, which channelizes the stream of modulation symbol vectors from each FFT processor 614 into a number of (up to L) sub-channel symbol streams. The sub-channel symbol streams from all FFT processors 614 are then processed, based on the (e.g., diversity or MIMO) communications mode used, prior to demodulation and decoding.

For a channel data stream transmitted using the diversity communications mode, the sub-channel symbol streams from all antennas used for the transmission of the channel data stream are presented to a combiner that combines the redundant information across time, space, and frequency. The stream of combined modulation symbols are then provided to a (diversity) channel processor 630 and demodulated accordingly.

For a channel data stream transmitted using the MIMO communications mode, all sub-channel symbol streams used for the transmission of the channel data stream are presented to a MIMO processor that orthogonalizes the received modulation symbols in each subchannel into the distinct eigenmodes. The MIMO processor performs the processing described by equation (2) above and generates a number of independent symbol sub-streams corresponding to the number of eigenmodes used at the transmitter unit. For example, MIMO processor can perform multiplication of the received modulation symbols with the left eigenvectors to generate post-conditioned modulation symbols, which correspond to the modulation symbols prior to the full-CSI processor at the transmitter unit. The (post-conditioned) symbol sub-streams are then provided to a (MIMO) channel processor 630 and demodulated accordingly. Thus, each channel processor 630 receives a stream of modulation symbols (for the diversity communications mode) or a number of symbol sub-streams (for the MIMO communications mode). Each stream or sub-stream of modulation symbols is then provided to a respective demodulator (DEMOD) that implements a demodulation scheme (e.g., M-PSK, M-OAM, or others) that is complementary to the modulation scheme used at the transmitter unit for the sub-channel being processed. For the MIMO communications mode, the demodulated data from all assigned demodulators may then be decoded independently or multiplexed into one channel data stream and then decoded, depending upon the coding and modulation method employed at the transmitter unit. For both the diversity and MIMO communications modes, the channel data stream from channel processor 630 may then provided to a respective decoder 640 that implements a decoding scheme complementary to that used at the transmitter unit for the channel data stream. The decoded data from each decoder 640 represents an estimate of the transmitted data for that channel data stream.

FIG. 6 represents one embodiment of a receiver unit. Other designs can contemplated and are within the scope of the present invention. For example, a receiver unit may be designed with only one receive antenna, or may be designed capable of simultaneously processing multiple (e.g., voice, data) channel data streams.

As noted above, multi-carrier modulation is used in the communications system of the invention. In particular, OFDM modulation can be employed to provide a number of benefits including improved performance in a multipath environment, reduced implementation complexity (in a relative sense, for the MIMO mode of operation), and flexibility. However, other variants of multi-carrier modulation can also be used and are within the scope of the present invention.

OFDM modulation can improve system performance due to multipath delay spread or differential path delay introduced by the propagation environment between the transmitting antenna and the receiver antenna. The communications link (i.e., the RF channel) has a delay spread that may potentially be greater than the reciprocal of the system operating bandwidth, W. Because of this, a communications system employing a modulation scheme that has a transmit symbol duration of less than the delay spread will experience inter-symbol interference (ISI). The ISI distorts the received symbol and increases the likelihood of incorrect detection.

With OFDM modulation, the transmission channel (or operating bandwidth) is essentially divided into a (large) number of parallel sub-channels (or sub-bands) that are used to communicate the data. Because each of the sub-channels has a bandwidth that is typically much less than the coherence bandwidth of the communications link, ISI due to delay spread in the link is significantly reduced or eliminated using OFDM modulation. In contrast, most conventional modulation schemes (e.g., QPSK) are sensitive to ISI unless the transmission symbol rate is small compared to the delay spread of the communications link.

As noted above, cyclic prefixes can be used to combat the deleterious effects of multipath. A cyclic prefix is a portion of an OFDM symbol (usually the front portion, after the IFFT) that is wrapped around to the back of the symbol. The cyclic prefix is used to retain orthogonality of the OFDM symbol, which is typically destroyed by multipath.

As an example, consider a communications system in which the channel delay spread is less than 10 $\mu$sec. Each OFDM symbol has appended onto it a cyclic prefix that insures that the overall symbol retains its orthogonal properties in the presence of multipath delay spread. Since the cyclic prefix conveys no additional information, it is essentially overhead. To maintain good efficiency, the duration of the cyclic prefix is selected to be a small fraction of the overall transmission symbol duration. For the above example, using a 5% overhead to account for the cyclic prefix, a transmission symbol duration of 200 $\mu$sec is adequate for a 10 $\mu$sec maximum channel delay spread. The 200 $\mu$sec transmission symbol duration corresponds to a bandwidth of 5 kHz for each of the sub-bands. If the overall system bandwidth is 1.2288 MHz, 250 sub-channels of approximately 5 kHz can be provided. In practice, it is convenient for the number of sub-channels to be a power of two. Thus, if the transmission symbol duration is increased to 205 $\mu$sec and the system bandwidth is divided into M=256 sub-bands, each sub-channel will have a bandwidth of 4.88 kHz.

In certain embodiments of the invention, OFDM modulation can reduce the complexity of the system. When the communications system incorporates MIMO technology, the complexity associated with the receiver unit can be significant, particularly when multipath is present. The use of OFDM modulation allows each of the sub-channels to be treated in an independent manner by the MIMO processing employed. Thus, OFDM modulation can significantly simplify the signal processing at the receiver unit when MIMO technology is used.

OFDM modulation can also afford added flexibility in sharing the system bandwidth, W, among multiple users. Specifically, the available transmission space for OFDM symbols can be shared among a group of users. For example, low rate voice users can be allocated a sub-channel or a fraction of a sub-channel in OFDM symbol, while the remaining sub-channels can be allocated to data users based on aggregate demand. In addition, overhead, broadcast, and control data can be conveyed in some of the available sub-channels or (possibly) in a portion of a sub-channel.

As described above, each sub-channel at each time slot is associated with a modulation symbol that is selected from some alphabet such as M-PSK or M-QAM. In certain embodiments, the modulation symbol in each of the L sub-channels can be selected such that the most efficient use is made of that sub-channel. For example, sub-channel 1 can be generated using QPSK, sub-channel 2 can be generate using BPSK, sub-channel 3 can be generated using 16-QAM, and so on. Thus, for each time slot, up to L modulation symbols for the L sub-channels are generated and combined to generate the modulation symbol vector for that time slot.

One or more sub-channels can be allocated to one or more users. For example, each voice user may be allocated a single sub-channel. The remaining sub-channels can be dynamically allocated to data users. In this case, the remaining sub-channels can be allocated to a single data user or divided among multiple data users. In addition, some sub-channels can be reserved for transmitting overhead, broadcast, and control data. In certain embodiments of the invention, it may be desirable to change the sub-channel assignment from (possibly) modulation symbol to symbol in a pseudo-random manner to increase diversity and provide some interference averaging.

In a CDMA system, the transmit power on each reverse link transmission is controlled such that the required frame error rate (FER) is achieved at the base station at the minimal transmit power, thereby minimizing interference to other users in the system. On the forward link of the CDMA system, the transmit power is also adjusted to increase system capacity.

In the communications system of the invention, the transmit power on the forward and reverse links can be controlled to minimize interference and maximize system capacity. Power control can be achieved in various manners. For example, power control can be performed on each channel data stream, on each sub-channel, on each antenna, or on some other unit of measurement. When operating in the diversity communications mode, if the path loss from a particular antenna is great, transmission from this antenna can be reduced or muted since little may be gained at the receiver unit. Similarly, if transmission occurs over multiple sub-channels, less power may be transmitted on the sub-channel(s) experiencing the most path loss.

In an implementation, power control can be achieved with a feedback mechanism similar to that used in the CDMA system. Power control 10 information can be sent periodically or autonomously from the receiver unit to the transmitter unit to direct the transmitter unit to increase or decrease its transmit power. The power control bits may be generated based on, for example, the BER or FER at the receiver unit.

Figure 7:
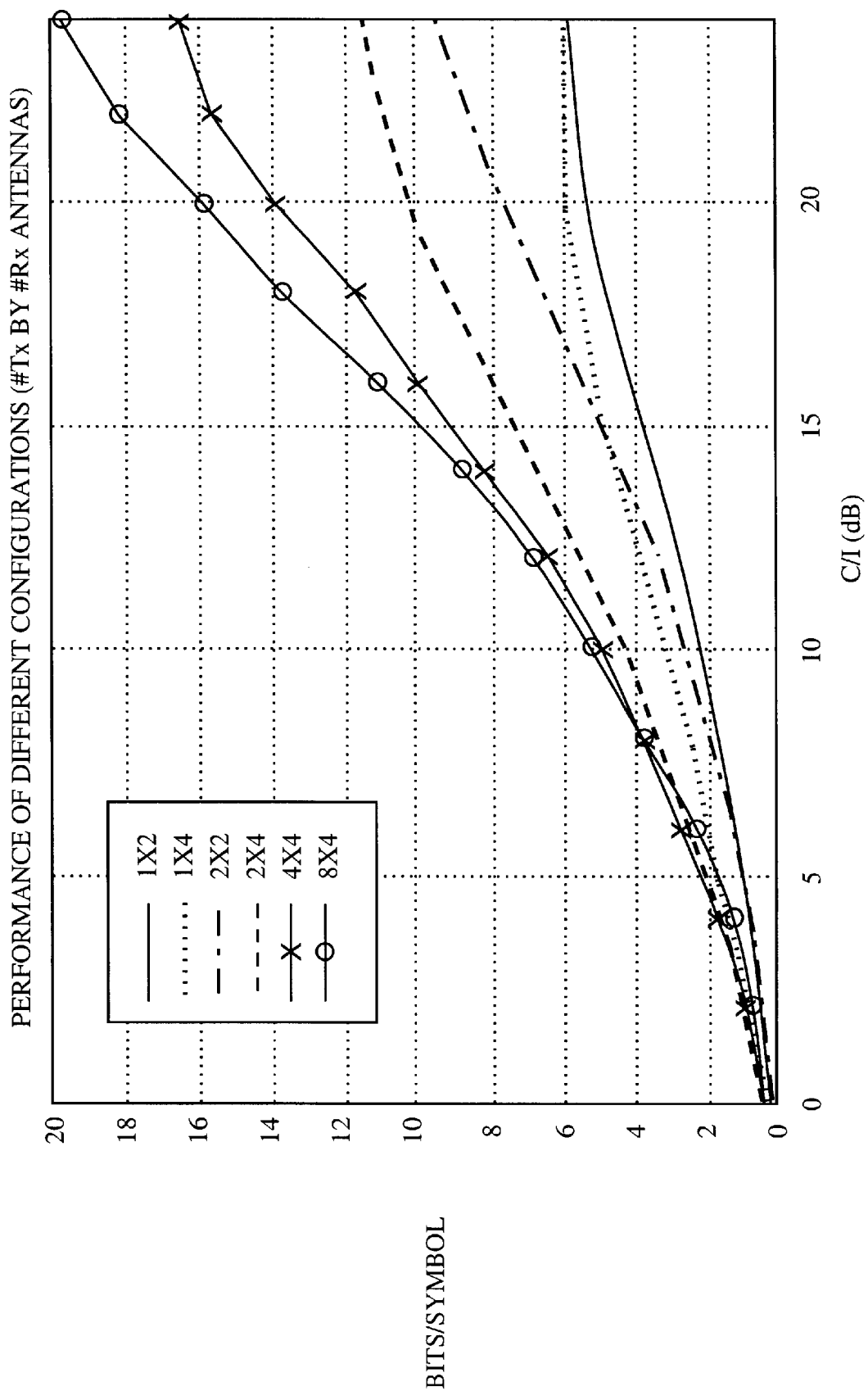
FIG. 7 shows plots that illustrate the spectral efficiency achievable with some of the operating modes of a communications system in accordance with one embodiment.

FIG. 7 shows plots that illustrate the spectral efficiency associated with some of the communications modes of the communications system of the invention. In FIG. 7, the number of bits per modulation symbol for a given bit error rate is given as a function of C/I for a number of system configurations. The notation $N_T \times N_R$ denotes the dimensionality of the configuration, with $N_T$=number of transmit antennas and $N_R$=number of receive antennas. Two diversity configurations, namely 1×2 and 1×4, and four MIMO configurations, namely 2×2, 2×4, 4×4, and 8×4, are simulated and the results are provided in FIG. 7.

As shown in the plots, the number of bits per symbol for a given BER ranges from less than 1 bps/Hz to almost 20 bps/Hz. At low values of C/I, the spectral efficiency of the diversity communications mode and MIMO communications mode is similar, and the improvement in efficiency is less noticeable. However, at higher values of C/I, the increase in spectral efficiency with the use of the MIMO communications mode becomes more dramatic. In certain MIMO configurations and for certain conditions, the instantaneous improvement can reach up to 20 times.

From these plots, it can be observed that spectral efficiency generally increases as the number of transmit and receive antennas increases. The improvement is also generally limited to the lower of $N_T$ and $N_R$. For example, the diversity configurations, 1×2 and 1×4, both asymptotically reach approximately 6 bps/Hz.

In examining the various data rates achievable, the spectral efficiency values given in FIG. 7 can be applied to the results on a sub-channel basis to obtain the range of data rates possible for the sub-channel. As an example, for a subscriber unit operating at a C/I of 5 dB, the spectral efficiency achievable for this subscriber unit is between 1 bps/Hz and 2.25 bps/Hz, depending on the communications mode employed. Thus, in a 5 kHz sub-channel, this subscriber unit can sustain a peak data rate in the range of 5 kbps to 10.5 kbps. If the C/I is 10 dB, the same subscriber unit can sustain peak data rates in the range of 10.5 kbps to 25 kbps per sub-channel. With 256 sub-channels available, the peak sustained data rate for a subscriber unit operating at 10 dB C/I is then 6.4 Mbps. Thus, given the data rate requirements of the subscriber unit and the operating C/I for the subscriber unit, the system can allocate the necessary number of sub-channels to meet the requirements. In the case of data services, the number of sub-channels allocated per time slot may vary depending on, for example, other traffic loading.

The reverse link of the communications system can be designed similar in structure to the forward link. However, instead of broadcast and common control channels, there may be random access channels defined in specific sub-channels or in specific modulation symbol positions of the frame, or both. These may be used by some or all subscriber units to send short requests (e.g., registration, request for resources, and so on) to the central station. In the common access channels, the subscriber units may employ common modulation and coding. The remaining channels may be allocated to separate users as in the forward link. Allocation and de-allocation of resources (on both the forward and reverse links) can be controlled by the system and can be communicated on the control channel in the forward link.

One design consideration for on the reverse link is the maximum differential propagation delay between the closest subscriber unit and the furthest subscriber unit. In systems where this delay is small relative to the cyclic prefix duration, it may not be necessary to perform correction at the transmitter unit. However, in systems in which the delay is significant, the cyclic prefix can be extended to account for the incremental delay. In some instances, it may be possible to make a reasonable estimate of the round trip delay and correct the time of transmit so that the symbol arrives at the central station at the correct instant. Usually there is some residual error, so the cyclic prefix may also further be extended to accommodate this residual error.

In the communications system, some subscriber units in the coverage area may be able to receive signals from more than one central station. If the information transmitted by multiple central stations is redundant on two or more sub-channels and/or from two or more antennas, the received signals can be combined and demodulated by the subscriber unit using a diversity-combining scheme. If the cyclic prefix employed is sufficient to handle the differential propagation delay between the earliest and latest arrival, the signals can be (optimally) combined in the receiver and demodulated correctly. This diversity reception is well known in broadcast applications of OFDM. When the sub-channels are allocated to specific subscriber units, it is possible for the same information on a specific sub-channel to be transmitted from a number of central stations to a specific subscriber unit. This concept is similar to the soft handoff used in CDMA systems.

As shown above, the transmitter unit and receiver unit are each implemented with various processing units that include various types of data processor, encoders, IFFTs, FFTs, demultiplexers, combiners, and so on. These processing units can be implemented in various manners such as an application specific integrated circuit (ASIC), a digital signal processor, a microcontroller, a microprocessor, or other electronic circuits designed to perform the functions described herein. Also, the processing units can be implemented with a general-purpose processor or a specially designed processor operated to execute instruction codes that achieve the functions described herein. Thus, the processing units described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for measuring and reporting transmission characteristics of a multiple input/multiple output communication system, comprising:

assigning a first subset of sub-channels of a plurality of sub-channels to a first transmit antenna of a plurality of transmit antennas of a first transmitter unit, wherein the sub-channels of the first subset of sub-channels are noncontiguous;

transmitting, by the first transmit antenna, a first pilot symbol over the sub-channels of the first subset of sub-channels;

receiving, by a first receive antenna of a first receiver unit, the first pilot symbol;

determining, from the received first pilot symbol, the transmission characteristics of the sub-channels of the first subset of sub-channels;

reporting, by the first receiver unit to the first transmitter unit, an information signal that carries the determined transmission characteristics for the sub-channels of the first subset of sub-channels; and optimizing a set of transmission parameters at the first transmitter unit, based on the information signal.

2. The method of claim 1, wherein the step of transmitting the first pilot symbol comprises:

generating a plurality of orthogonal frequency-division multiplexed (OFDM) sub-channel subsets, wherein each OFDM sub-channel subset comprises sub-channels that are disjoint from the sub-channels of all other OFDM sub-channel subsets; and the step of transmitting the first pilot symbol over the sub-channels of the first subset of sub-channels comprises transmitting the first pilot symbol over each of the sub-channels of a first subset of the plurality of OFDM sub-channel subsets.

3. The method of claim 2, wherein the step of generating the plurality of OFDM sub-channel subsets comprises reusing at least one the plurality of OFDM sub-channel subsets if at least one transmit antenna is spatially distant from any other transmit antenna of the plurality of transmit antennas.

4. The method of claim 2, wherein the step of determining the transmission characteristics of the sub-channels of the first subset of sub-channels comprises analyzing the first pilot symbol received over each of the sub-channels of the first subset of the plurality of OFDM sub-channel subsets.

5. The method of claim 2 further comprising;

associating the first subset of the plurality of OFDM sub-channel subsets with a principal link corresponding to the first receiver unit and the first transmitter unit; and associating a second subset of the plurality of OFDM sub-channel subsets with an interfering link, the interfering link corresponding to the first receiver unit and a second transmitter unit.

6. The method of claim 5, wherein the information signal carries the transmission characteristics associated with the principal link and the interfering link.

7. The method of claim 5 further comprising:

transmitting, by the second transmit unit, a second pilot symbol over each of the sub-channels of the second subset of the plurality of OFDM sub-channel subsets;

receiving, by the first receive antenna, the second pilot symbol;

determining, from the received second pilot symbol, the average total interference level of the interfering link; and reporting, by the first receiver unit to the first transmitter unit, the average total interference level of the interfering link.

8. The method of claim 5 further comprising:

transmitting, by the second transmit unit, a second pilot symbol over each of the sub-channels of the second subset of a plurality of disjoint OFDM sub-channel subsets;

receiving, by the first receive antenna, the second pilot symbol;

determining, from the received second pilot symbol, the total measured power of the interfering link; and reporting, by the first receiver unit to the first transmitter unit, the total measured power of the interfering link.

9. The method of claim 1, further comprising orthogonally coding the first pilot symbol.

10. The method of claim 9, wherein the first pilot symbol is orthogonally coded with a Walsh code sequence.

11. The method of claim 1, wherein the first pilot symbol comprises a shifted Maximal-Length Shift Register sequence (m-sequence).

12. The method of claim 11, wherein the first pilot symbol comprises a shifted, appended m-sequence, wherein the shifted, appended m-sequence includes a repeated portion of the m-sequence.

13. The method of claim 1, wherein the step of reporting the information signal comprises:

generating a polynomial function representative of the determined transmission characteristics; and transmitting a set of coefficients associated with the polynomial function.

14. The method of claim 1, wherein the determined transmission characteristics comprise the channel impulse responses for the first subset of sub-channels.

15. The method of claim 1, further comprising:

generating a scheduling message at the first transmitter unit; and transmitting the scheduling message to the first receiver unit;

the step of reporting the information signal comprises reporting the information signal according to the scheduling message.

16. The method of claim 1 further comprising determining, from the determined transmission characteristics of the sub-channels of the first subset of sub-channels, the transmission characteristics of the sub-channels not included in the first subset of sub-channels.

17. The method of claim 16, wherein the information signal further carries the determined transmission characteristics for the sub-channels not included in the first subset of sub-channels corresponding to the first transmit antenna and the first receive antenna.

18. The method of claim 1 further comprising:
assigning a second subset of sub-channels of the plurality of sub-channels to a second transmit antenna of the plurality of transmit antennas; and
transmitting, by the second transmit antenna, a second pilot symbol over the sub-channels of the second subset of sub-channels.

19. A method for measuring and reporting channel state information (CSI) in a multiple input/multiple output (MIMO) system, comprising:
assigning a plurality of sub-channel subsets to a plurality of transmit antennas of at least one transmitter unit, wherein the sub-channels of each of the sub-channel subsets are noncontiguous;
transmitting a plurality of Orthogonal Frequency Division Multiplexed (OFDM) pilot waveforms from the at least one transmitter unit to at least one receiver unit, wherein each of the plurality of OFDM pilot waveforms is transmitted over a separate one of the plurality of sub-channel subsets;
receiving, by the at least one receiver unit, the plurality of OFDM pilot waveforms;
demodulating the received plurality of OFDM pilot waveforms;
determining the CSI of the sub-channels corresponding to each of the plurality of sub-channel subsets from the demodulated plurality of OFDM pilot waveforms;
transmitting the determined CSI to the at least one transmitter unit, and
preconditioning a transmission symbol according to the determined CSI.

20. The method of claim 19, wherein:
the step of determining the CSI of the sub-channels corresponding to each of the plurality of sub-channel subsets comprises compressing the CSI into a reduced matrix; and
the step of transmitting the determined CSi comprises transmitting a representation of the reduced matrix to the at least one transmitter unit.

21. The method of claim 20, wherein the reduced matrix is a multiplication result from multiplying a channel response matrix and a complex-conjugate of the channel response matrix, wherein the channel response matrix includes a plurality of CSI gain values.

22. The method of claim 21, wherein the representation of the reduced matrix is an eigenmode matrix.

23. The method of claim 19, wherein the step of determining the CSI of the sub-channels corresponding to each of the plurality of sub-channel subsets comprises:
determining the channel frequency responses of the sub-channels corresponding to each of the plurality of sub-channel subsets; and
performing an inverse Fast Fourier Transform (IFFT) operation on the determined channel frequency responses.

24. A system for measuring and reporting channel state information (CSI) in a multiple input/multiple output communication system, comprising:
a base station comprising:
a plurality of transmit antennas;
a first processor for preconditioning transmission data, for assigning a plurality of pilot symbols to the plurality of transmit antennas, for assigning a plurality of sub-channel subsets to the plurality of transmit antennas, wherein each of the assigned sub-channel subsets comprises sub-channels that are noncontiguous; and
a plurality of modulators, each modulator connected to the first processor and a separate one of the plurality of transmit antennas, for modulating the assigned plurality of pilot symbols onto the respective assigned plurality of sub-channel subsets;
wherein the plurality of transmit antennas transmits each of the assigned plurality of pilot symbols over the respective assigned sub-channel subsets; and
a receiver unit comprising;
at least one receive antenna for receiving the plurality of pilot symbols transmitted over the sub-channel subsets;
at least one demodulator, coupled to the at least one receive antenna, for demodulating the received plurality of pilot symbols; and
a second processor, connected to the at least one demodulator, for determining the CSI from the demodulated plurality of pilot symbols, and for generating a CSI message for transmission to the base station;
wherein the at least one receive antenna transmits the CSI message;
wherein at least one of the plurality of transmit antennas receives the CSI message, at least one of the plurality of modulators modulates the received CSI message, and the first processor preconditions the transmission data according to the CSI obtained from the modulated CSI message.

25. The system of claim 24, wherein the second processor generates the CSI message for the noncontiguous channels of a sub-channel subset of the plurality of sub-channel subsets.

26. The system of claim 24, wherein the plurality of pilot symbols comprises a plurality of orthogonal pilot symbols.

27. The system of claim 24, wherein the plurality of pilot symbols comprises a plurality of periodic OFDM symbols.

28. The system of claim 24, wherein the plurality of pilot symbols comprises a plurality of shifted Maximal-Length Shift Register sequences (m-sequences).

29. An apparatus for measuring and reporting transmission characteristics of a multiple input/multiple output communication system, comprising:
means for assigning a first subset of sub-channels of a plurality of sub-channels to a first transmit antenna of a plurality of transmit antennas of a first transmitter unit, wherein the sub-channels of the first subset of sub-channels are noncontiguous;
means for transmitting, by the first transmit antenna, a first pilot symbol over the sub-channels of the first subset of sub-channels;
means for receiving, by a first receive antenna of a first receiver unit, the first pilot symbol;
means for determining, from the received first pilot symbol, the transmission characteristics of the sub-channels of the first subset of sub-channels;
means for reporting, by the first receiver unit to the first transmitter unit, an information signal that carries the determined transmission characteristics for the sub-channels of the first subset of sub-channels; and
means for optimizing a set of transmission parameters at the first transmitter unit, based on the information signal.

* * * * *